US008381635B2

(12) United States Patent
O'Brien et al.

(10) Patent No.: US 8,381,635 B2
(45) Date of Patent: Feb. 26, 2013

(54) PORTABLE ESPRESSO COFFEE APPARATUS

(75) Inventors: Stephen J. O'Brien, San Jose, CA (US);
Jacques Gagne, Los Gatos, CA (US);
Stephen Hooper, Los Gatos, CA (US);
Benjamin Pei-Ming Chia, Cupertino, CA (US); Yi-Chun Liao, Taichung (TW); Ray Gradwohl, Saratoga, CA (US); Kenneth Robertson, San Jose, CA (US)

(73) Assignee: Espressi, Inc., San Jose, CA (US)

( * ) Notice: Subject to any disclaimer, the term of this patent is extended or adjusted under 35 U.S.C. 154(b) by 417 days.

(21) Appl. No.: 12/649,269

(22) Filed: Dec. 29, 2009

(65) Prior Publication Data
US 2010/0218686 A1    Sep. 2, 2010

Related U.S. Application Data

(63) Continuation-in-part of application No. 12/425,365, filed on Apr. 16, 2009.

(60) Provisional application No. 61/141,226, filed on Dec. 29, 2008.

(51) Int. Cl.
*A47J 31/44*    (2006.01)
*A47J 31/00*    (2006.01)

(52) U.S. Cl. .......... 99/302 R; 99/295; 99/323.1; 99/323

(58) Field of Classification Search .............. 99/302 R, 99/323.1, 323.2, 323, 322, 317, 295
See application file for complete search history.

(56) References Cited

U.S. PATENT DOCUMENTS

| | | | |
|---|---|---|---|
| 4,386,109 A * | 5/1983 | Bowen et al. | 426/241 |
| 5,329,975 A * | 7/1994 | Heitel | 141/19 |
| 5,458,165 A * | 10/1995 | Liebmann, Jr. | 141/64 |
| 5,509,349 A | 4/1996 | Anderson et al. | |
| D515,347 S | 2/2006 | Reuss, Jr. et al. | |
| 7,357,070 B2 * | 4/2008 | Chan | 99/285 |
| D606,795 S | 12/2009 | Liao et al. | |
| D614,432 S | 4/2010 | Liao et al. | |
| 7,832,329 B2 * | 11/2010 | Crescenzi | 99/303 |
| 8,127,664 B2 * | 3/2012 | Nielsen et al. | 99/302 R |
| 2002/0178932 A1 | 12/2002 | Cai | |
| 2006/0090653 A1 | 5/2006 | McDuffie et al. | |
| 2008/0196593 A1 * | 8/2008 | Shrader et al. | 99/300 |
| 2008/0302252 A1 | 12/2008 | O'Brien et al. | |
| 2010/0011966 A1 * | 1/2010 | Nielsen et al. | 99/302 R |
| 2010/0162899 A1 | 7/2010 | O'Brien et al. | |

FOREIGN PATENT DOCUMENTS

WO   PCT/US2008/66616   12/2008
WO   PCT/US2009/69758    8/2010

OTHER PUBLICATIONS

International Search Report; PCT/US08/66616; Date Mailed: Oct. 22, 2008; 3 pgs.
International Search Report; PCT/US09/69758; Date Mailed: May 3, 2010; 3 pgs.
International Preliminary Report on Patentability; PCT/US2008/066616; Date of Issuance: Dec. 11, 2009; 8 pgs.
Written Opinion of the International Searching Authority; PCT/US09/69758; Date Mailed: May 3, 2010; 3 pgs.

* cited by examiner

*Primary Examiner* — Reginald L Alexander
(74) *Attorney, Agent, or Firm* — Beyer Law Group LLP

(57) ABSTRACT

A brewing device comprising a brewing system; a handle assembly coupled to the brewing system and containing a source of compressed fluid; and a valve system, coupled to the handle, to selectively place the source of compressed fluid in fluid communication with the brewing system.

4 Claims, 21 Drawing Sheets

PORTABLE ESPRESSO COFFEE APPARATUS

CROSS-REFERENCE TO RELATED APPLICATIONS

The present patent application is a Continuation-In-Part of U.S. patent application Ser. No. 12/425,365 filed Apr. 16, 2009, entitled PORTABLE BREWING APPARATUS and having Stephen J. O'Brien, Yi-Chun Liao, Stephen Hooper, Benjamin Pei-Ming Chia, Jacques Gagne, Ray Gradwohl and Kenneth Robertson identified as inventors, which claims priority to U.S. provisional patent application No. 61/141,226, filed Dec. 29, 2008 entitled PORTABLE BREWING DEVICE AND METHOD OF MAKING AND OPERATING, having Stephen J. O'Brien, Jacques Gagne, Stephen Hooper, Jacques Gagne, Benjamin Pei-Ming Chia, Yi-Chun Liao, Donna Liao, Ray Gradwohl and Kenneth Robertson identified as inventors. The instant application claims priority to U.S. provisional patent application No. 61/141,226, filed Dec. 29, 2008 entitled PORTABLE BREWING DEVICE AND METHOD OF MAKING AND OPERATING, having Stephen J. O'Brien, Jacques Gagne, Stephen Hooper, Jacques Gagne, Benjamin Pei-Ming Chia, Yi-Chun Liao, Donna Liao, Ray Gradwohl and Kenneth Robertson identified as inventors.

FIELD OF THE INVENTION

The invention relates to an apparatus and method for brewing beverages. More particularly, the present invention relates to a portable apparatus for brewing beverages by passing heated liquid through a brewing substance, such as coffee.

BACKGROUND OF THE INVENTION

First consumed in the ninth century, the beverage coffee has spread throughout the globe to be one of the largest traded commodities in modern times. Several devices have been developed to prepare the coffee beverage that typically requires brewing ground roasted coffee beans.

One such device is a percolating device that forces boiling water into a chamber above a filter by pressurized steam. The water then passes through the grounds due to gravity, repeating the process until shut off by an internal timer or, more commonly, a thermostat that turns off the heater when the entire volume reaches a certain temperature.

Coffee may also be brewed by steeping in a device such as a coffee press in which ground coffee beans and hot water are combined and left to brew for a few minutes. A plunger is then depressed to separate the coffee grounds from the water. Because the coffee grounds are in direct contact with the water, all the coffee oils remain in the beverage, making it stronger and leaving more sediment than in coffee made by a percolating device.

An espresso device produces one of the more popular coffee beverages. The espresso device forces heated pressurized water through ground coffee beans. As a result of brewing under high pressure the coffee beverage produced by this device, an espresso beverage, is more concentrated than the coffee beverage produce by the percolator device or the coffee press device. Additionally, the espresso device produces a much desired crema.

The science and physical requirements for producing a good espresso are well known to those versed in the art. They include high pressures of approximately 130 psi-240 psi. Water temperature typically in a range of 197° F.-205° F., and the coffee beans freshly roasted and ground within at least two weeks of the brewing process. Espresso is obtained by traversing hot water through coffee grounds for no longer than 25-30 seconds. Failure to meet any of these requirements can result in an expresso beverage that may be lacking in taste, too bitter to the taste, or that may be lacking sufficient crema in part or in whole. The water temperature can be controlled. Since the heated water typically is prepared close to the natural boiling point of water at sea level, it can be used to deliver a consistent pressure required to produce a good espresso. Most espresso machines, however, are heavy and bulky due to the high-pressure water pumps and pipes, pressure bypass valves and other engineering requirements incorporated into the device. Whereas the coffee press and percolating devices can be made small and portable, espresso-based beverages are increasingly popular and are typically made with large, non-portable equipment.

There is a need, therefore, for an espresso device with an acceptable footprint and operation that facilitates portability of the same.

BRIEF SUMMARY

A brewing device, comprising a brewing system; a handle assembly coupled to the brewing system and containing a source of compressed fluid; and a valve system, coupled to the handle, to selectively place the source of compressed fluid in fluid communication with the brewing system.

BRIEF DESCRIPTION OF THE DRAWINGS

FIG. 3 is a schematic view demonstrating the operation of a back-flow-valve shown in FIG. 1, in accordance with the present invention;

DETAILED DESCRIPTION

Figure 1:
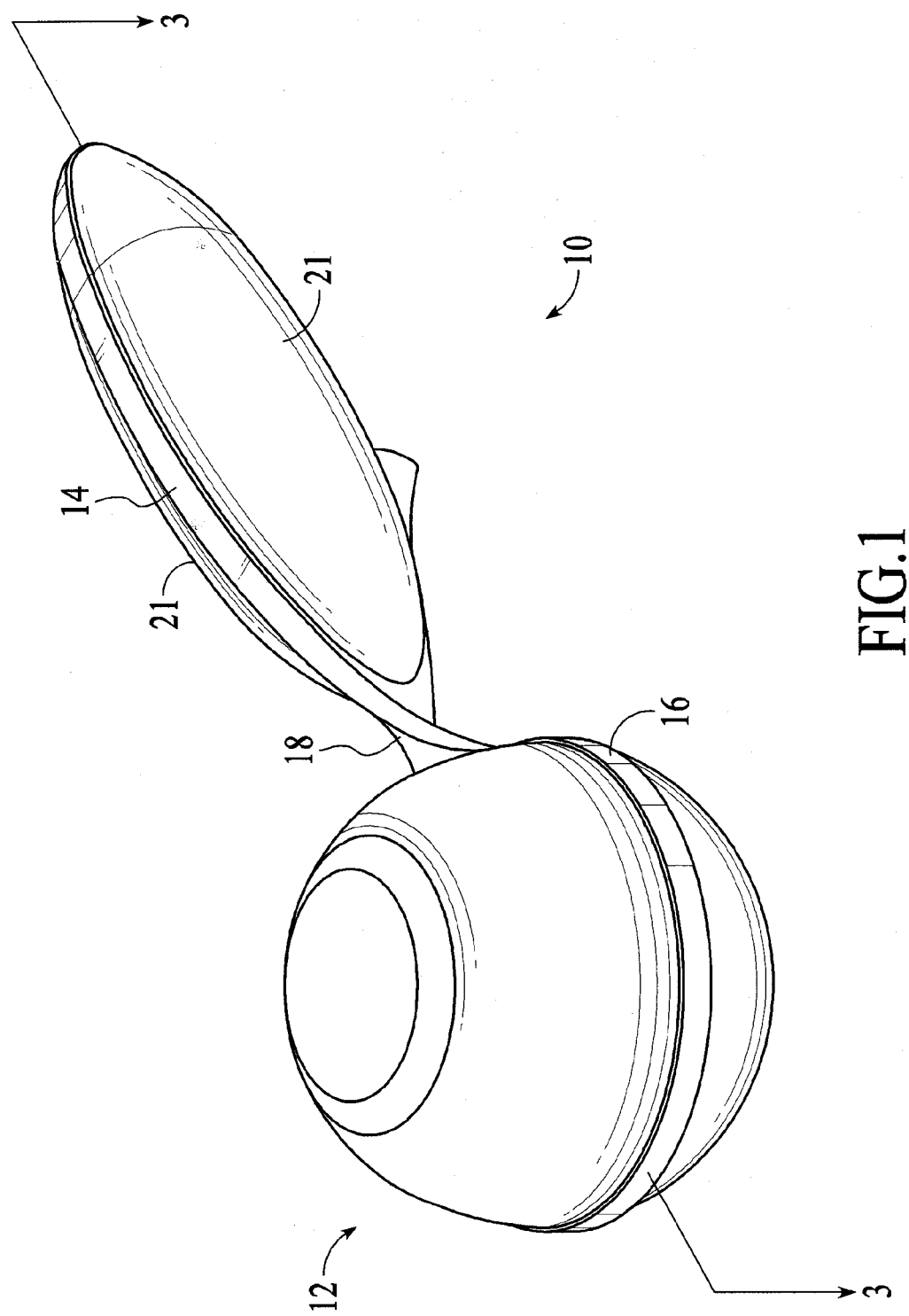
FIG. 1 is a perspective view of the a portable brewing device in accordance with the present invention.
Figure 2:
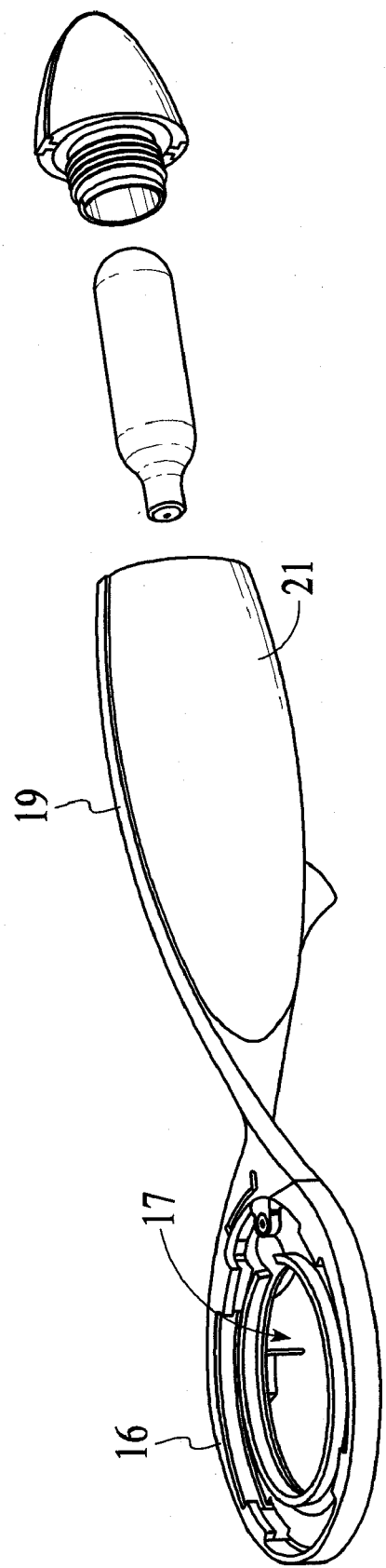
FIG. 2 is a perspective view showing a frame of the device shown in FIG. 1.

Referring to both FIGS. 1 and 2, shown is a portable brewing apparatus 10 that includes a brewing system 12, a handle assembly 14, an annular frame 16, having a central throughway 17, and a shaft 18. Shaft 18 extends between annular frame 16 and handle assembly 14. Handle assembly 14 includes a frame portion 19. Coupled to frame portion 19 are handle covers 21. Shaft 18 and frame portion 19 are integral with annular frame 16 assembly 14. Shaft 18 extends between frame 16 and handle assembly 14. Annular frame 16, shaft 18 and frame portion 19 are typically formed from a material through thermal energy may propagate, such as a metal that may be machined or die-cast, such as aluminum, steel and the like. Handle covers 21 are typically fabricated from a material that propagates thermal energy substantially less efficient that frame 16, shaft and or frame portion 19. For example, handle covers 21 may be formed from plastic, rubber and the like.

Figure 3:
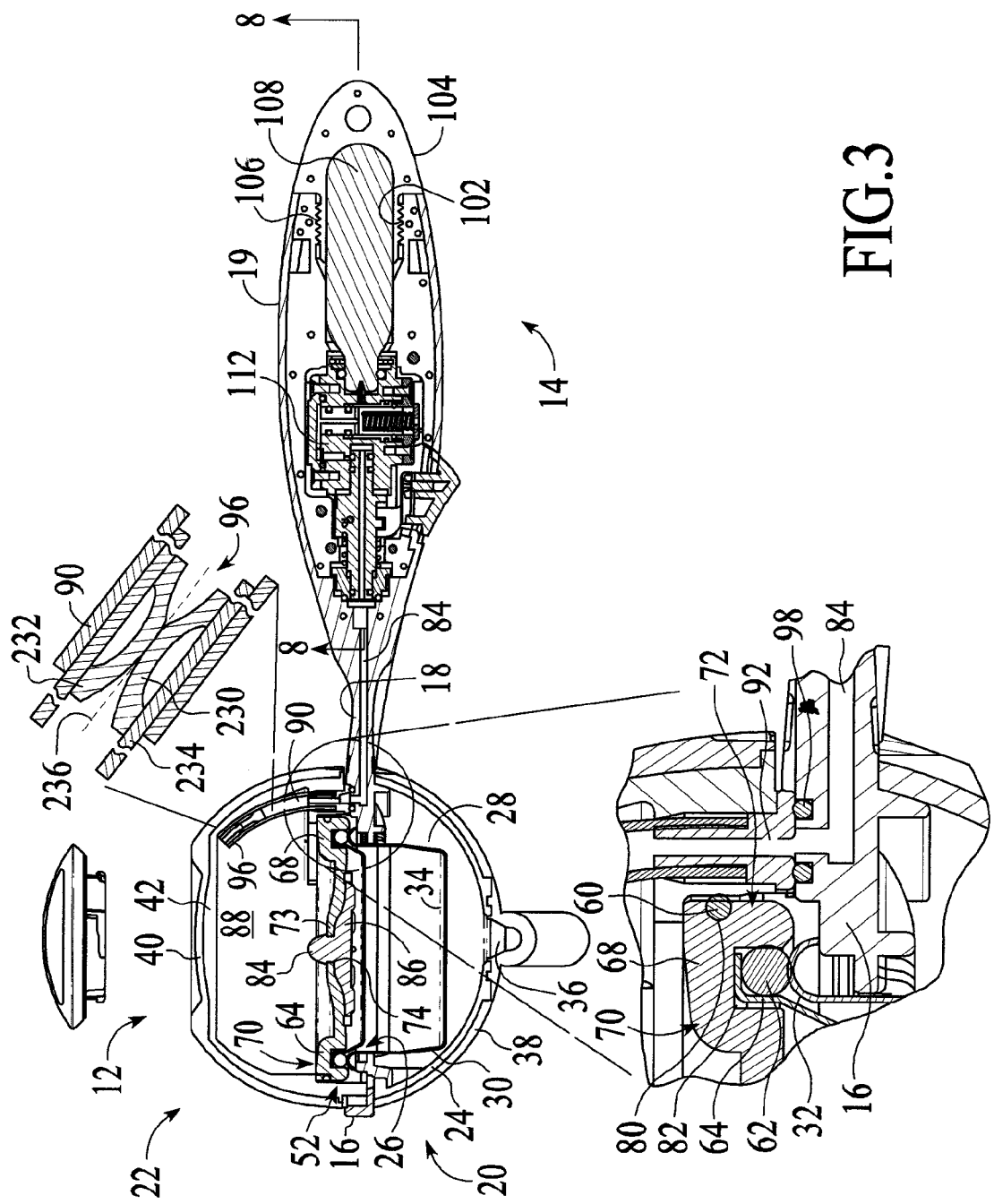
FIG. 3 is a cross-sectional view of the portable brewing device shown in FIG. 1 taken along lines 3-3.

Referring to FIGS. 1, 2 and 3, brewing system 12 includes a collection assembly 20 and a fluid injection assembly 22 each of which is mounted to frame 16, using a bayonet mounting system. Collection assembly 20 and fluid injection assembly 22 are mounted to opposing sides of annular frame 16. Collection assembly 20 includes a bowl-shaped wall 24 extending from a circular opening 26 terminating opposite to frame 16, defining a collection chamber 28. Circular opening 26 is in superimposition with central throughway 17. Disposed within both central throughway 17 and circular opening 26 is a receptacle 30. Receptacle 30 extends from an annular shoulder 32 and terminates in a nadir surface 34 spaced-apart from circular opening 26. Annular shoulder 32 has a diameter that is slightly larger than the diameter of central throughway 17. In this manner, annular frame 16 supports annular shoulder 32 so that nadir surface 34 is disposed within collection assembly 20, spaced-apart from wall 24 when receptacle 30 is seated in collection assembly 20. Nadir surface 34 includes a plurality of through-holes (not shown). Typically bowl-shaped wall 24 is formed from a lightweight material, such as plastic and receptacle 30 is formed from metal, such as, aluminum, steel and the like. Formed into wall 24, opposite to circular opening 26, is a fluid exhaust port 36. Fluid exhaust port 36 may be configured to facilitate removal, from collection assembly 20, of liquid passing through nadir surface 34. To that end, fluid exhaust port 36 may be any shape desired, including shapes that are be compatible with well known espresso brewing device accessories and is typically formed from a metal, such as aluminum, steel and the like. A sleeve 38 covers portion of wall 24, which may be formed from the same materials as handle covers 21, shown in FIG. 1. Wall 24 and receptacle 30 are formed from any suitable material such as aluminum, steel, plastic and the like, shown in FIG. 3.

Figure 4:
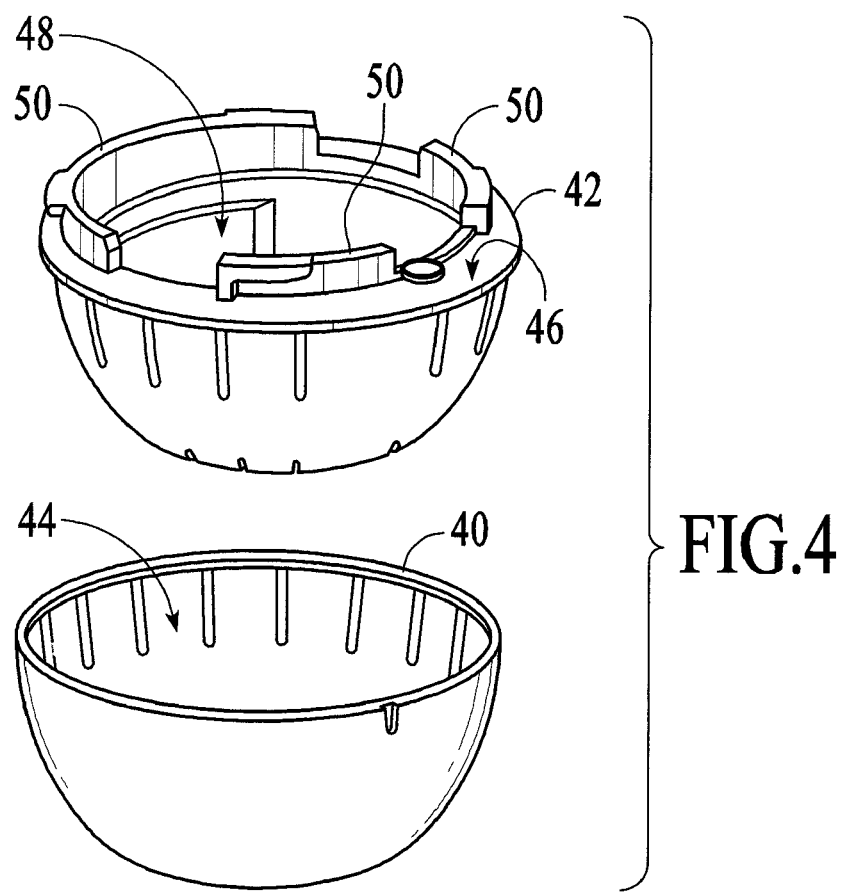
FIG. 4 is an exploded view of components of a fluid injection assembly shown in FIG. 3.
Figure 5:
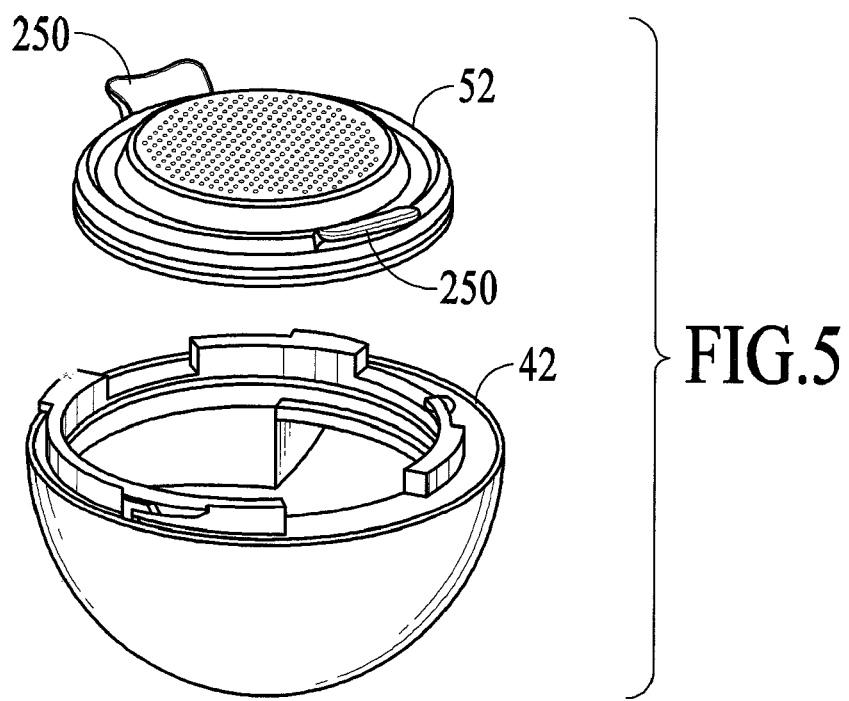
FIG. 5 is an exploded view of a fluid injection assembly shown in FIG. 3.

Referring to both FIGS. 3 and 4, fluid injection assembly 22 includes a pair of bowl-shaped bodies, cover 40 and pressure vessel 42, having complementary shapes. Cover 40 defines a recess 44 and is shaped and sized appropriately with respect to pressure vessel 42 so that pressure vessel 42 is received therein. Cover 40 is typically formed from the same materials as handle covers 21, shown in FIG. 1. Pressure vessel 42, shown in FIGS. 3 and 4, is typically formed from a metal, such as, aluminum, steel and the like. Pressure vessel 42 includes an annular surface 46 that defines an opening 48. Extending from annular surface 46 is a plurality of spaced-apart projections 50 configured to facilitate coupling of pressure vessel 42 to annular frame 16 using a bayonet mounting technique.

Referring to FIGS. 3, 4, 5 and 6, also included in fluid injection assembly 22 is a fluid propagation control system (FPC) 52 configured to cover the entire cross-sectional area of opening 48 when in superimposition therewith. FPC system 52 includes a showerhead 54, a fluid manifold 56 and a flexible membrane 58 disposed between fluid manifold 56 and showerhead 54. Flexible membrane 58 may be fabricated from rubber, soft plastic and the like. First and second FPC annular O-rings 60 and 62 are included with FPC system 52. O-rings 60 and 62, as with any O-rings mentioned below, may be fabricated from any suitable material such as Buna-N, silicone and the like.

Figure 6:
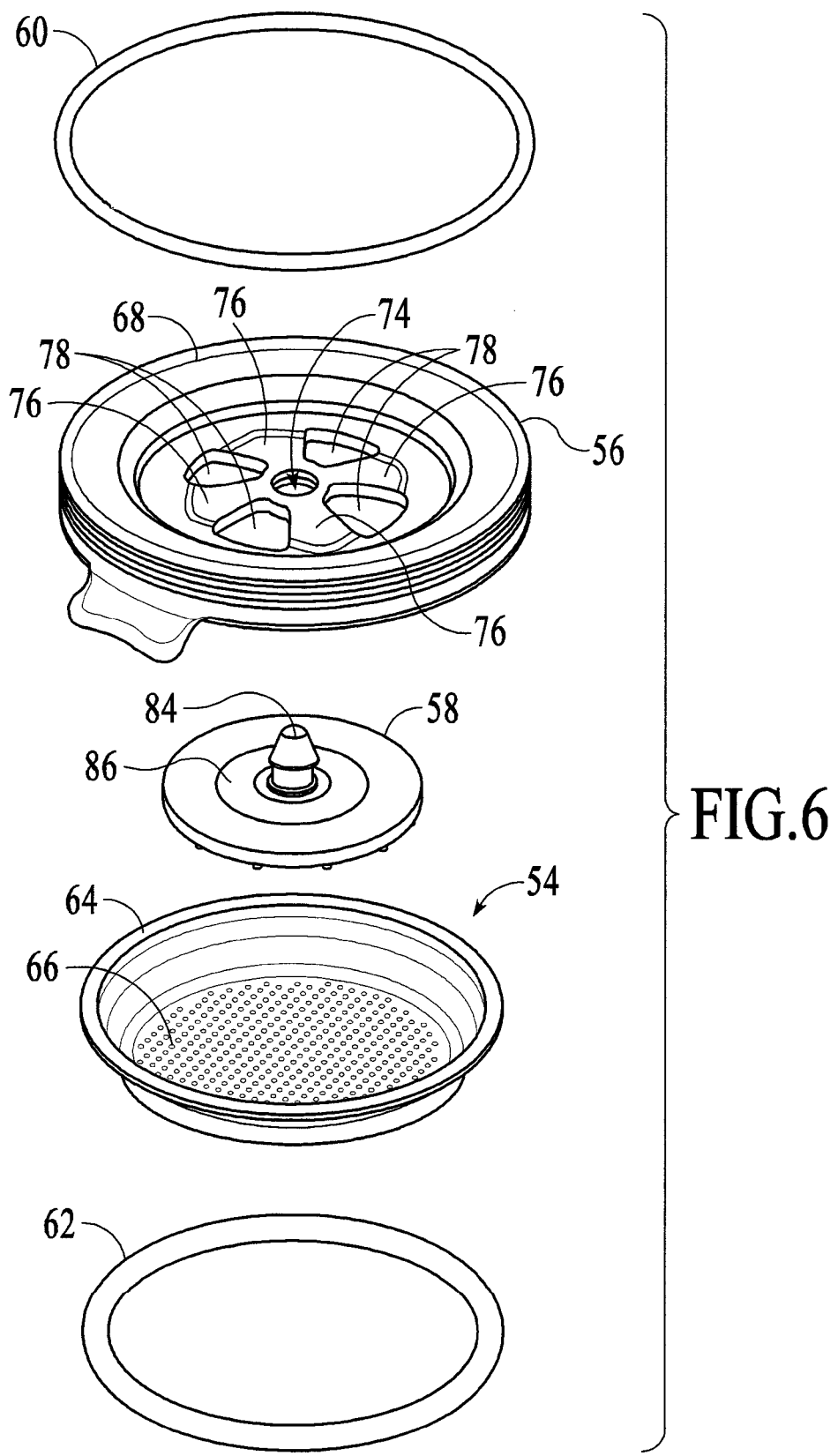
FIG. 6 is an exploded view of a fluid propagation control system shown in FIGS. 3.

Referring to both FIGS. 3 and 6, showerhead 56 includes a circular shoulder 54 and extends therefrom terminating in a circular screen portion 66 having a plurality of through holes that allows fluid, such as heated water, to pass therethrough and impinge upon nadir surface 34. Second FPC O-ring 62 is positioned against shoulder 64. The through holes in screen portion 66 are configured to allow a desired distribution of fluid, such as water and steam, to impinge upon the brewing substance in receptacle 30. It is desired that the fluid propagating through screen portion 66 is evenly distributed over the area of the brewing substance (not shown).

Fluid manifold 56 has a circular shoulder region 68 with a first surface 70 facing away from showerhead 54 and a second surface 72 extending transversely to first surface 70. Shoulder 68 is radially and symmetrically disposed about a membrane coupler 73. Membrane coupler 73 has an opening 74. Extending from membrane coupler 73 are a plurality of spaced-apart spokes 76, each pair of which defines a passageway 78 through which fluid may traverse. A first annular recess 80 is formed into second surface 72 proximate to first surface 70. A second annular recess 82 is formed in shoulder 68 opposite first surface 70 and extends away therefrom. First FPC O-ring 60 is disposed in first recess 80. Circular shoulder 64 and second FPC O-ring 62 are disposed in second annular recess 80. Fluid manifold 56 is typically fabricated from plastic, but may be fabricated from any suitable material such as aluminum, steel and the like.

Flexible membrane 58 includes a centrally disposed detent 84 extending from a flexible region 86 and is received in opening 74 forming an interference fit with membrane coupler 73. Flexible region 86 has sufficient area to be in superimposition with spokes 76 and passageways 78. When FPC system 52 is disposed in opening 48 a chamber 88 is defined by FPC system 52 and pressure vessel 42.

With collection assembly 20 and fluid injection assembly 22 both mounted to annular frame 16, a fluid-tight seal is formed by first FPC O-ring 60 and both pressure vessel 42 and second surface 72; and a fluid-tight seal is formed between second FPC O-ring 62 and both shoulders 80 and 32. Fluid is allowed to ingress into chamber 88 by coupling one end of a flexible passageway 90, which may be in the form of surgical tubing, to a coupling orifice 92 coupled to into annular frame 16. Coupling orifice 92 places flexible passageway 90 in fluid communication with a channel 84 formed into neck 18. As shown, coupling orifice 92 is positioned between pressure vessel 42 and PFC system 52 with flexible passageway 90 extending therefrom away from PFC system 52 juxtaposed against pressure vessel 42 and matching a profile thereof, terminating in backflow valve 96. Backflow valve 96 is received within one end of flexible passageway 90, disposed opposite to coupling orifice 92, forming an interference fit therewith. To maintain fluid-tight integrity between annular frame 16 and coupling orifice 92 a gasket 98 is disposed therebetween that is formed from any suitable material such as Buna-N, silicone and the like.

Figure 7:
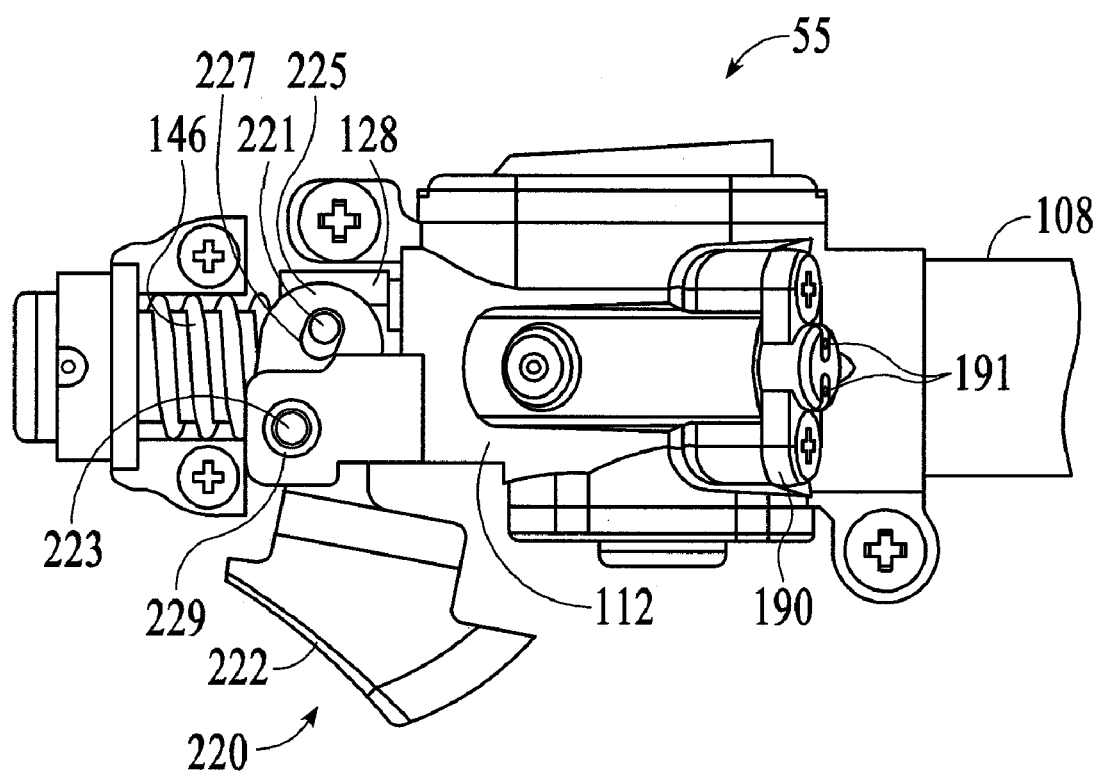
FIG. 7 is a side view of a pressure regulation system, in accordance with the present invention.
Figure 8:
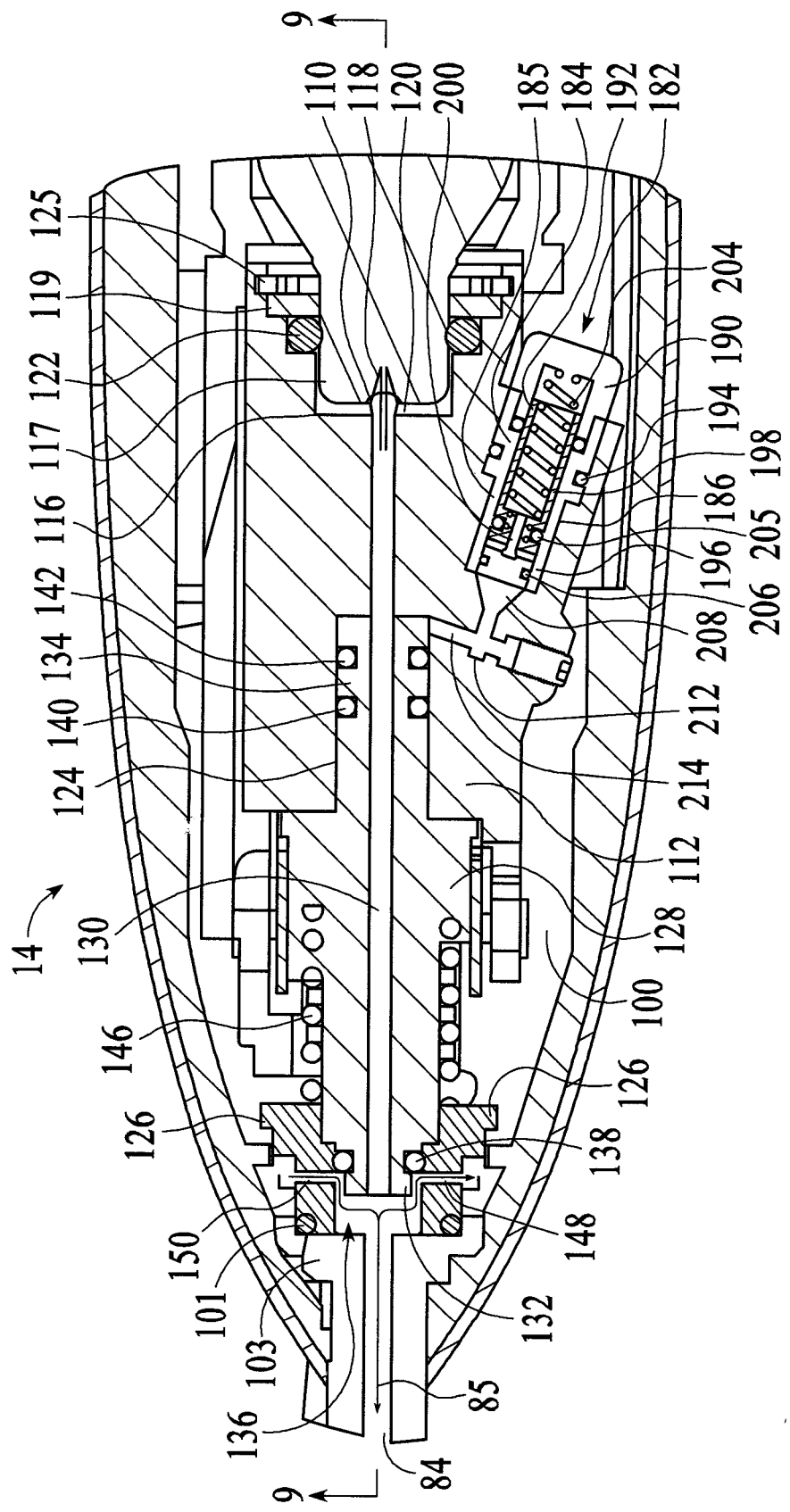
FIG. 8 is a detailed cross-sectional view of a handle assembly, shown in FIG. 3, taken along lines 8-8, demonstrating the position of components contained therein with a trigger assembly placed in a first trigger configuration.
Figure 9:
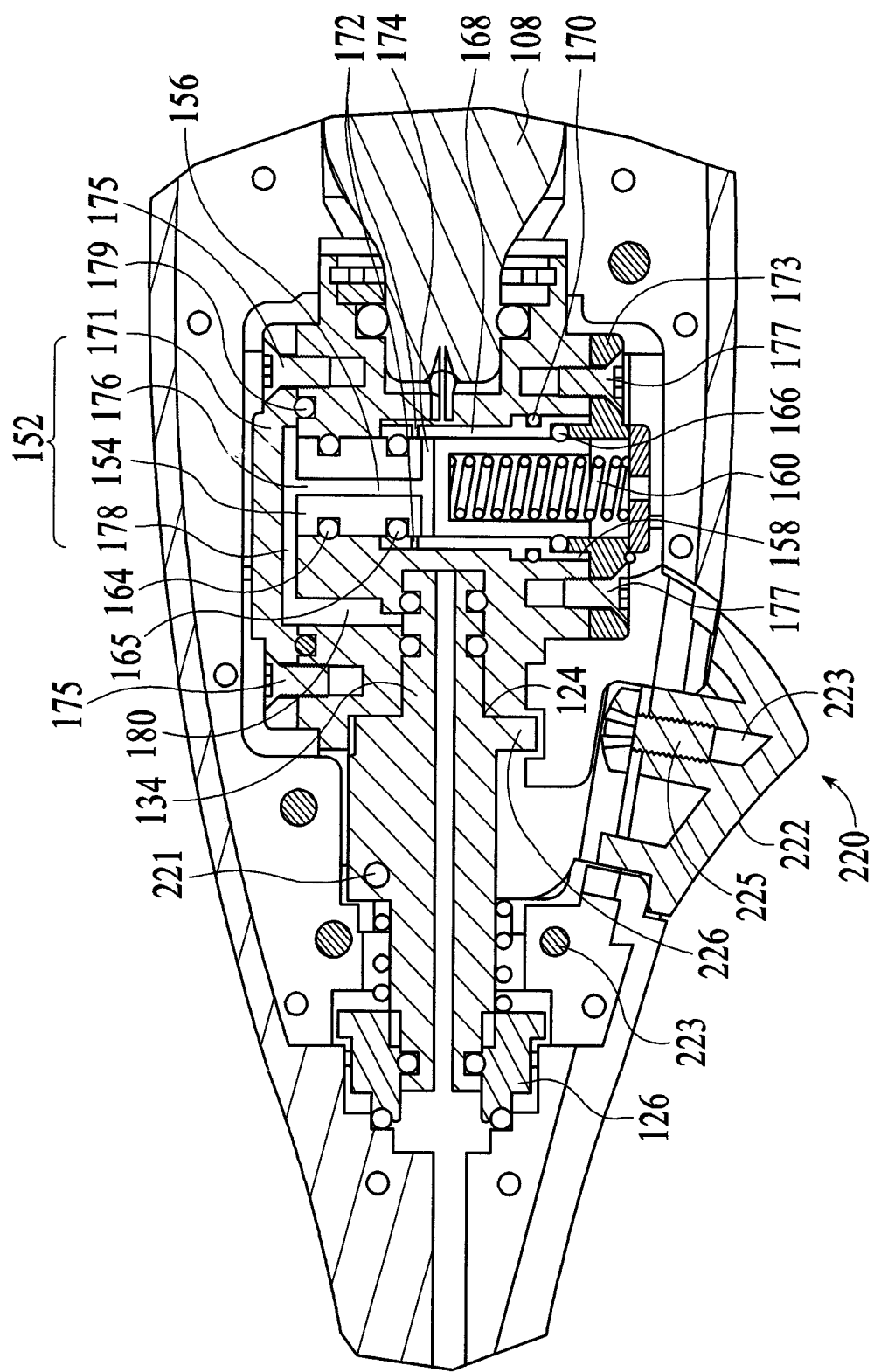
FIG. 9 is a detailed cross-sectional view of a handle assembly, shown in FIG. 3, demonstrating the position of components contained therein with a trigger assembly placed in a first trigger configuration.

Referring to FIGS. 3, 7 and 8, frame portion 19 of handle assembly 14 defines a void 100 in which a pressure regulation system 55 (PRS) is disposed. At one end of void 100, disposed opposite to brewing system 12, is an opening defined by a threaded surface 102. A removable terminus 104 has a threaded surface 106 with a profile matching threaded surface 102 by which to couple and decouple terminus 104 with respect to frame portion 19. Both threaded surfaces 102 and 106 may be formed from the same materials used to form frame portion 19, e.g., metal that may be machined or die-cast. PRS 55 includes a bulwark 112 coupled to frame portion 19 with a plurality of fasteners (not shown). Bulwark 112 may be formed from the same materials used to form frame portion 19, e.g., metal that may be machined or die-cast. A portion of bulwark 112 facing terminus 104 includes a first bulwark recess 116 to receive a fluid container 108. Extending from one end 117 of first bulwark recess 116 is a hollow piercing implement 118 having a channel 120. When received within first bulwark recess 116, fluid container 108 extends from terminus 104, terminating in a frangible seal 110 positioned proximate to end 117. Fluid container 108 typically houses compressed fluid and is formed from a metal, such as aluminum, steel and the like. When terminus 104 is threaded onto frame portion 19 piercing implement 118 breaks frangible seal 110 placing an inner chamber (not shown) of fluid container 108 in fluid communication with channel 120. Surrounding end 117 is an annular O-ring 122 forming a fluid-tight seal between end 117 and bulwark 112. A washer 119 is disposed to cover O-ring 122 and hold the same in place. A "C" clip is disposed adjacent to washer 119 to hold the same against bulwark 112. To that end, an annular recess 125 is formed into first recess 116 in which "C" clip is received to concurrently fit again both washer 119 and bulwark 112.

A second bulwark recess 124 is formed in bulwark 112, opposite to first bulwark recess 116. PRS 55 also includes a cylindrical bearing member 126 and a valve body 128. Bearing member 126 is fixedly attached to frame portion 19 using any suitable means, such as fasteners (not shown) so as to be spaced-apart from bulwark 112, facing second bulwark recess 124. Positioned between bulwark 112 and bearing member 126 is valve body 128. Valve body 128, typically formed from a metal such as brass, bronze and the like, has a central throughway 130 extending along a longitudinal axis (not shown) thereof. Projections extend from opposed ends of valve body 128 and are radially and symmetrically disposed about central throughway 130, defining first and second valve elements 132 and 134. Bearing member 126, typically formed from the same type of materials as frame portion 19, e.g., metals that may be machined or die cast, includes a hollow bore 136 extending therethrough, and valve element 132 is disposed within hollow bore 136. Surrounding first valve element 132 is an annular O-ring 138 forming a fluid tight seal between bearing member 126 and first valve element 132. A pair of spaced-apart annular O-rings 140 and 142 surround valve element 134. O-rings 140 and 142 form a fluid-tight seal between valve element 134 and bulwark 112. A helical spring 146 is disposed around valve body 128 and resiliently biases the same so that valve element 134 is disposed within second bulwark recess 124. The relative dimensions of valve element 134 and second bulwark recesses 124 are established so that substantially the entire volume of second bulwark recesses 124 is filled by valve element 134 when resiliently biased thereagainst. The relative dimensions of valve element 132 and central bore 136 are established so that a portion of the volume of central bore 136 is not filled by valve element 132 when helical spring 146 resiliently biases valve body 128 to have valve element 134 fill the volume of second bulwark recess 124. In this position, referred to as the first trigger configuration, a pair of exhaust ports 148 and 150 are in fluid communication with channel 84 via central bore 136. Ports 148 and 150 place central bore 136 in fluid communication with void 100. In this manner, a flow path 85 is defined between channel 84 and void 100. To maintain fluid-tight integrity of central bore 136, an annular O-ring 101 is disposed between bearing member 126 and a neck coupler 103 integrally formed with neck 18.

Referring to FIGS. 7, 8, 9 and 10, also included in PRS 55, between fluid container 108 and second bulwark recess 124, is a pressure regulator 152. Pressure regulator 152 includes a cylindrical metal valve body 154, typically formed from a metal, machined to have a "T-channel" 156 extending along two orthogonal directions and a hollow recess 158 in which a helical spring 160 is disposed. Valve body 154 is disposed within a hollow chamber of bulwark 112. A plurality of annular O-rings 164, 165 and 166 surround body 154. The hollow chamber extends between opposed surfaces of bulwark 112 and each of the opposed ends thereof are capped with covers 171 and 173. Cover 171 is held in place with threaded fasteners 175, and cover 173 is held in place with threaded fasteners 177. An annular O-ring 179 is positioned between cover 171 and bulwark 112 so as to surround an opening at one end of the hollow chamber, forming a fluid-tight seal between bulwark 112 and cover 171. A metal sleeve 168, typically formed from a metal such as brass, bronze and the like, is disposed within the hollow chamber and is surrounded by an annular O-ring 170 to form a fluid-tight seal between sleeve 168 and bulwark 112. O-ring 164 forms a fluid-tight seal between valve body 154 and bulwark 112. Each of O-rings 165 and 166 forms a fluid-tight seal between valve body 154 and sleeve 168. Sleeve 168 includes one or more apertures 172 extending through opposed surfaces of sleeve 168 and in fluid communication with valve body 154. Although two apertures 172 are shown, in the present embodiment a plurality of apertures 172 are formed into sleeve so as to lie in a common plane to define a ring of apertures 172 formed into sleeve.

Specifically, O-ring 165 moves past apertures 172 to selectively place channel 120 in fluid communication with channel 156. Spring 160 is configured to compress upon a sufficient magnitude of fluid pressing in channel 156. In this situation valve body 154 moves toward cover 173 causing O-ring 165 to move past apertures 172, positioning O-ring 165 between apertures 172 and cover 173. This substantially reduces, if not prevents, fluid flow between channels 120 and 156. Upon the pressure in channel 156 reaching a desired pressure level, spring 160 moves valve body 154 away from cover 172, positing O-ring 165 as shown. This facilitates fluid communication between channel 120 and 156. In this manner, regulator 152 maintains a desired fluid pressure in T-channel 156 and, therefore, facilitates control of fluid pressure in fluid injection assembly 22, shown in FIG. 3. It is desired to provide each of apertures 172, shown in FIG. 9, with dimensions so as to minimize the friction between O-ring 165 when in superimposition therewith. To that end, the aggregate volume of apertures 172 is established to provide the desired pressure of fluid exiting container 108, which the individual dimensions of apertures 172 are established to avoid premature compromise of the structural integrity of O-ring 165 due to friction. As a result, the dimensions and number of apertures 172 included in sleeve 168 is a function of the material from which sleeve 168 and O-ring 165 are fabricated, as well as the fluid in container 108 and the desired pressure.

A first opening 174 of T-channel 156 faces sleeve 168 and is in fluid communication therewith. A second opening 176 of T-channel 156 is disposed opposite to recess 158 and faces away from helical spring 160. Second opening 176 is in fluid communication with a pair of channels 178 and 180. Channel 180 extends from second bulwark recess 124 and terminates in channel 178 and channel 178 extends from channel 180 and terminates in second opening 176.

Figure 11:
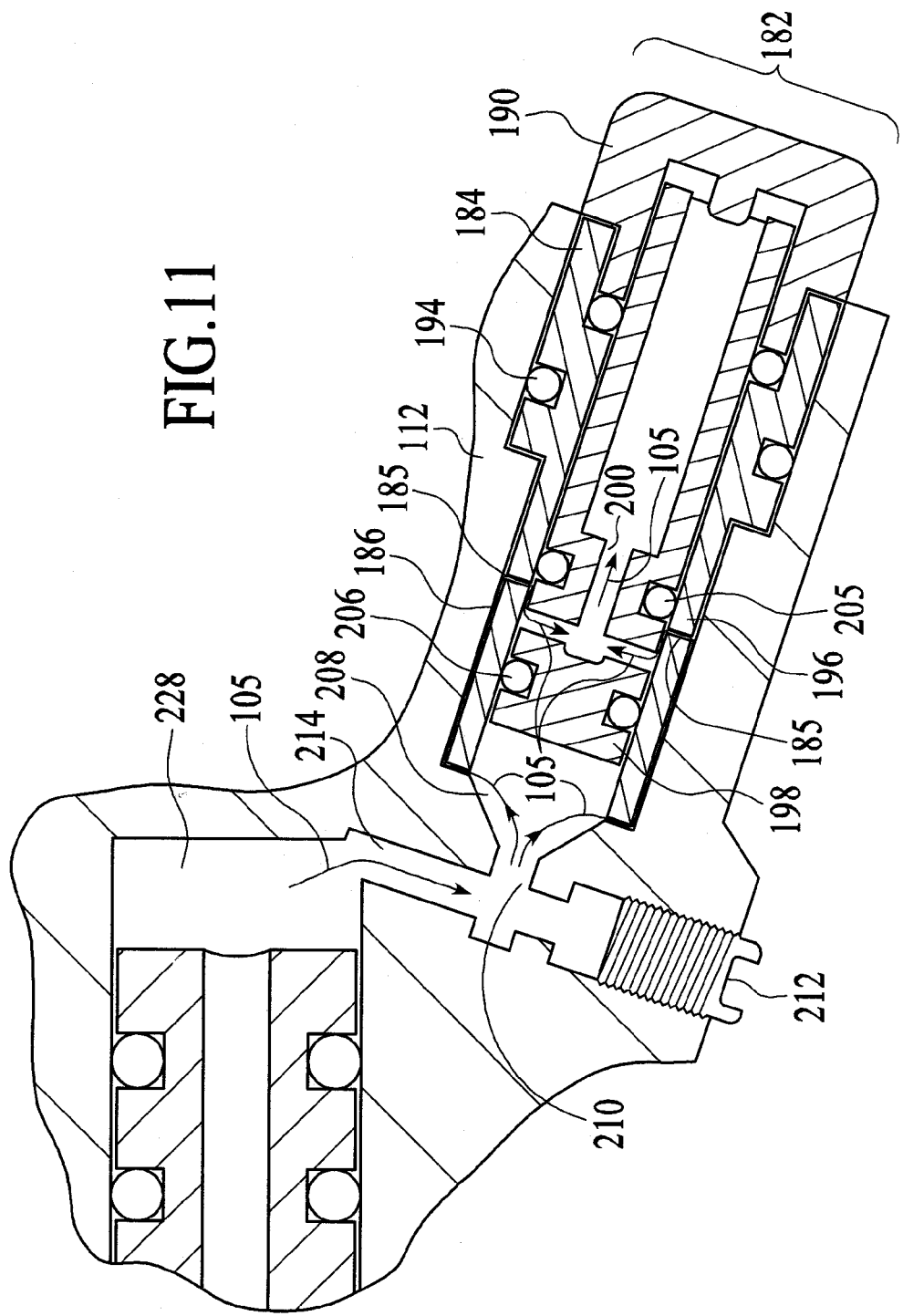
FIG. 11 is a detailed view of components of a maximum pressure regulator shown in FIG. 8.

Referring to FIGS. 7, 8 and 11 also included in PRS 55 is a maximum pressure regulator (MPR) 182. MPR 182 includes a hollow cylindrical sleeve 184, typically formed from a metal such as brass, bronze and the like, and disposed within a bore 186 of bulwark 112. Cylindrical sleeve 184 includes apertures 185 and extends from bore 186, terminating in an opening. A venting cap 190, formed from any suitable material, such as aluminum, steel, brass, bronze and the like, covers the opening and includes a tapered portion 192 that is inserted into sleeve 184, as well as apertures 184 allowing venting into void 100. Threaded fasteners 191 hold venting cap 190 onto bulwark 112. An annular O-ring 194 surrounds sleeve 184 and forms a fluid-tight seal between bulwark 112 and sleeve 184. A portion 196 of sleeve 184 extends from O-ring 194 and has a smaller outside diameter than the remaining portion of sleeve 184. Disposed within sleeve 184 is a metal valve body 198 machined to have a "T-channel" 200 extending along two orthogonal directions and a hollow recesses in which a helical spring 204 is disposed. Valve body 198 is disposed within sleeve 184. A plurality of annular O-rings 205 and 206 surround body 198 forming a fluid-tight seal between sleeve 184 and valve body 198. Formed into bulwark 112, opposite to cover 190 is a frusto-conically shaped chamber 208 extending from bore 186 and terminating in an opening 210 that is in fluid communication with a throughway 214, which is in fluid communication with second bulwark recess 124. A threaded plug 212 seals one end of throughway 214. O-rings 205 and 206 form a trap to prevent fluid propagating through throughway 214, opening 210 and chamber 208 from propagating through apertures 185 to exhaust through vent cap 190, except when a predetermine fluid pressure is present in chamber 228 due to pressure build-up in device 10. Exhausting through vent cap 190 occurs when O-ring 205 is positioned between vent cap 190 and apertures 185. This occurs when sufficient fluid force impinges upon metal valve body 198 compresses helical spring 204 positioning O-ring 205 between apertures 185 and vent cap 190. As a result, O-ring 205 will move past apertures 185 generating friction therebetween. Thus, although two apertures 185 are shown, in the present embodiment a plurality of apertures 185 are formed into sleeve, typically four, so as to lie in a common plane to define a ring of apertures 185. It is desired to provide each apertures with dimensions so as to minimize the friction between O-ring 205 when in superimposition therewith. To that end, the aggregate volume of apertures 185 is established to provide the desired fluid flow, with the individual dimensions of apertures 185 being established to avoid premature compromise of the structural integrity of O-ring 205 due to friction. The dimensions and number of apertures 185 included in sleeve 184 is a function of the material from which sleeve 184 and O-ring 205 are fabricated, as well as the fluid in container 108 and the desired pressure of operation.

Referring to both FIGS. 7 and 8, operation of PRS 55 is controlled by movement of a trigger assembly 220 that includes a trigger element 222 coupled to both bulwark 112 and valve body 128 through a pair of spaced-apart journals 221 and 223. Each journal extends transversely to central throughway 130. Trigger element 222 includes two spaced apart cam elements, one of which is shown 225. Each of cam elements 225 is rotatably coupled to one of the opposed ends of journals 221 and 223. To that end, cam elements 225 include first and second journal bearings 227 and 229. Journal bearing 229 is radially symmetrically formed with respect to a central axis of journal 223. Journal bearing 227 is elongated to enable opposed ends of journal bearing 227 to reciprocate with respect to journal 221. One end of journal 223 is connected to bulwark 112 such that a longitudinal axis of journal 223 is in a fixed spatial relationship therewith. A longitudinal axis of journal 221 is in a fixed spatial relationship with valve body 128 and moves with respect to bulwark 112. Specifically, journal 221 extends through opposed sides of valve element 128. In this fashion, by actuation of trigger element 222, cam elements 225 cantilever with respect to journal 223 moving valve body 128 back and forth along a direction parallel to central throughway 130.

Trigger assembly 220 is coupled to maintain a first trigger configuration without any force being applied to trigger element 222. In the first trigger configuration, helical spring 146 resiliently biases valve body 128 so that valve element 134 substantially fills bulwark recess 124. Trigger element 222 includes fastener opening 223 and is fastened to trigger assembly 220 with a fastener, such as a screw 225, which may be adjusted for calibration of switch position. In the first trigger configuration valve bodies 128, 154 and 196 are positioned, in the absence of fluid pressure. As a result, fluid communication between channel 84 and void 100 is maintained via ports 148 and 150, fluid communication between channel 84 and either channel 120 or throughway 214 is precluded. Channel 84 is isolated from channel 120 and throughway 214.

Figure 12:
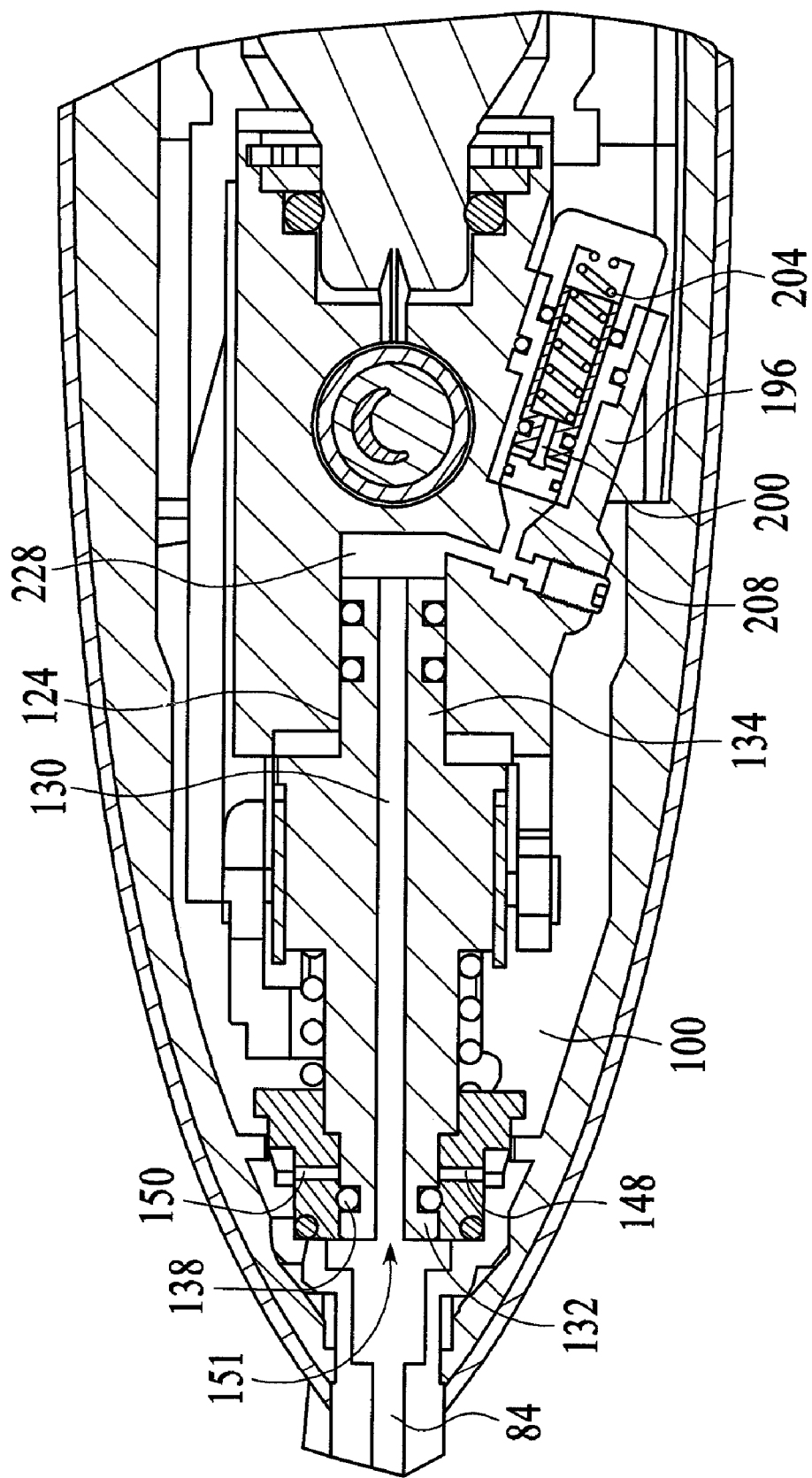
FIG. 12 is a detailed cross-sectional view of a handle assembly, shown in FIG. 8 demonstrating the position of components contained therein with a trigger assembly placed in a second trigger configuration.
Figure 13:
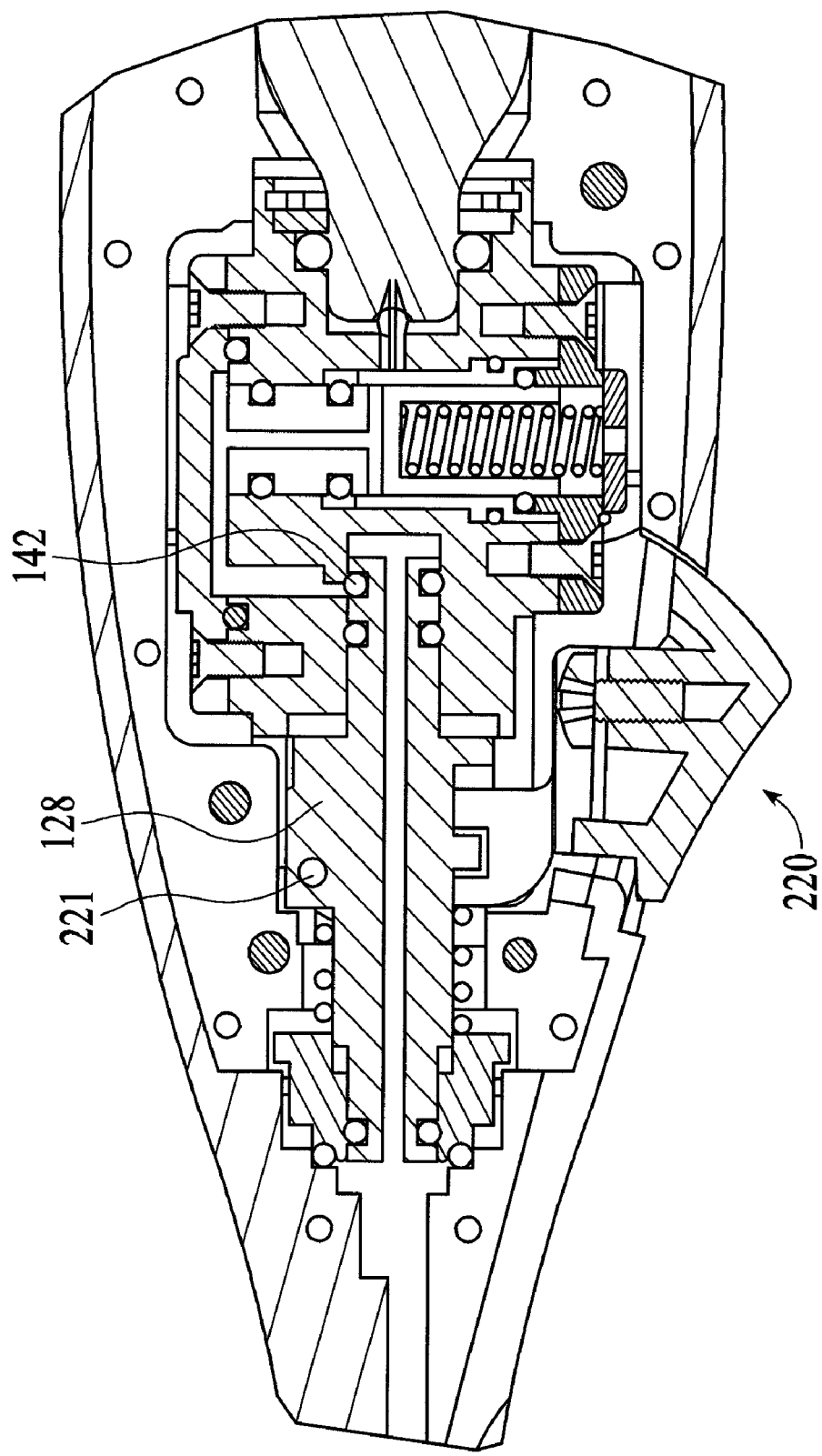
FIG. 13 is a detailed cross-sectional view of a handle assembly, shown in FIG. 9, demonstrating the position of components contained therein with a trigger assembly placed in a second trigger configuration.

Referring to both FIGS. 12 and 13, with trigger assembly 220 in a second trigger configuration, trigger assembly 220 moves valve body 128 so that valve element 132 covers ports 148 and 150, with O-ring 138 positioned between channel 84 and both exhaust ports 148 and 150. This isolates void 100 from channel 84 and forms a volume 228 between valve element 134 and second bulwark recess 124. Additionally, flow between container 108 and channel 84 is prevented in the second trigger configuration due to the position of O-ring 142 between an opening 151 in one end of central throughway 130 and an opening of channel 180 facing valve element 134.

Figure 10:
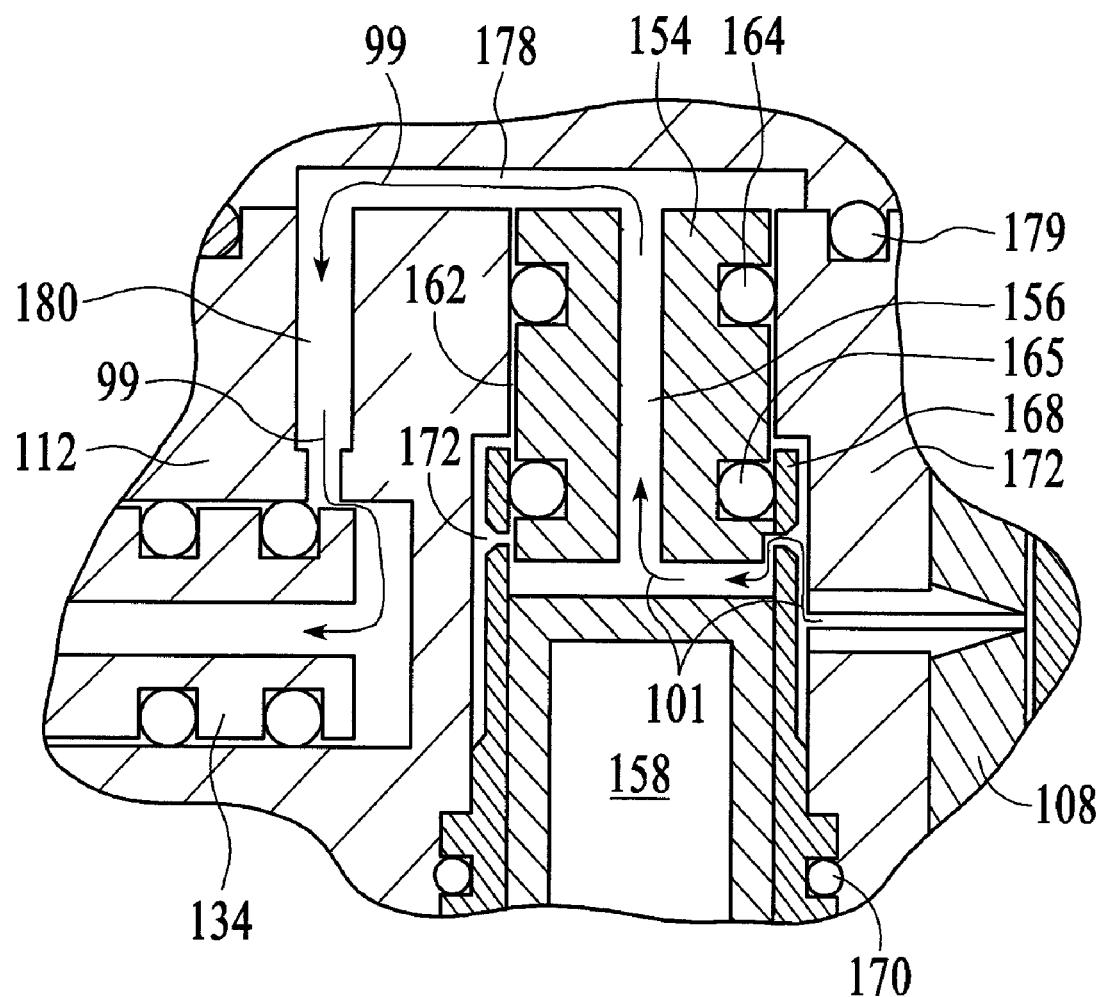
FIG. 10 is a detailed view of a components of a pressure regulator and surrounding components of a pressure regulation system shown in FIG. 9.
Figure 14:
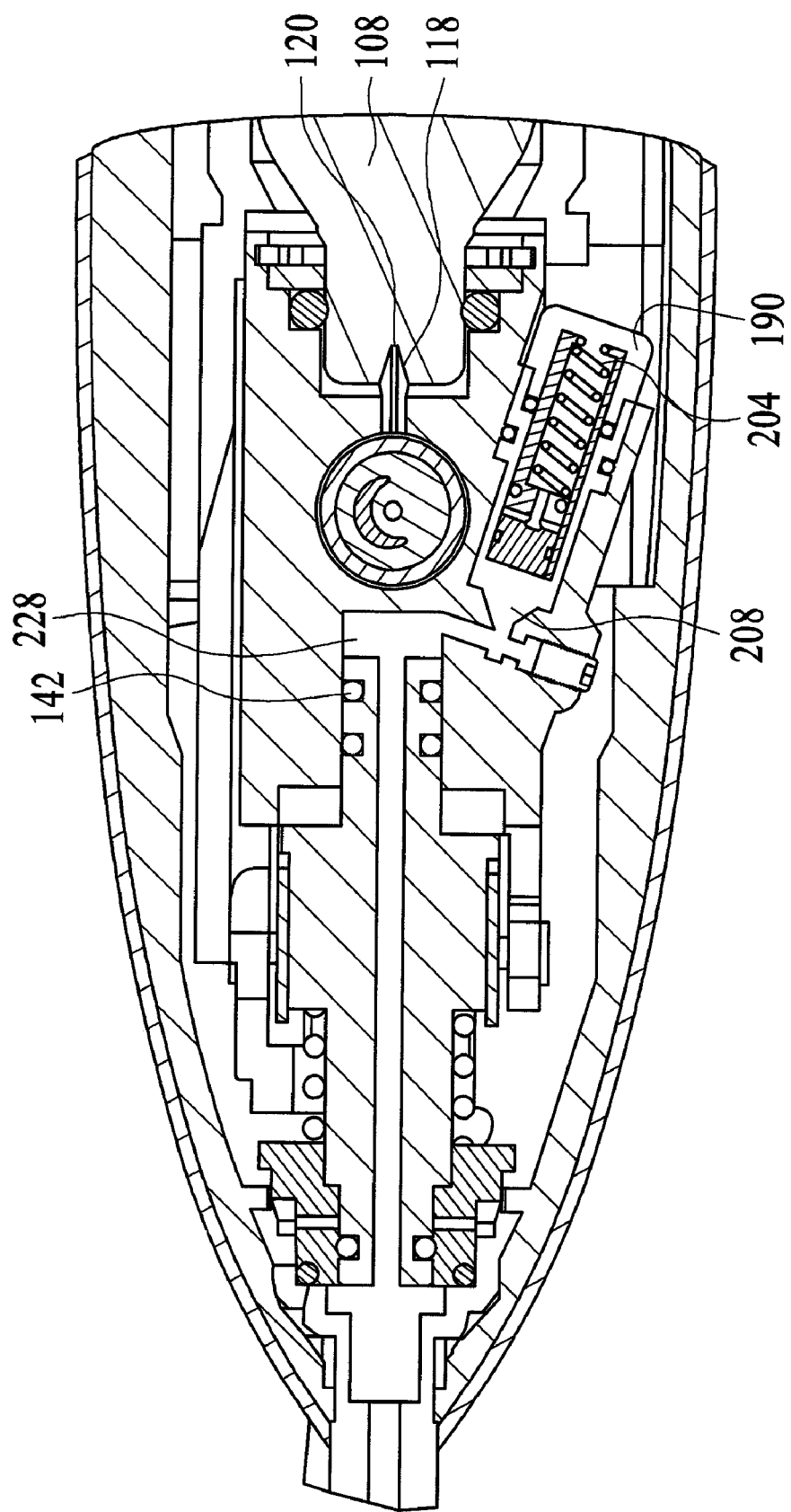
FIG. 14 is a detailed cross-sectional view of a handle assembly, shown in FIG. 8, demonstrating the position of components contained therein with a trigger assembly placed in a third trigger configuration.
Figure 15:
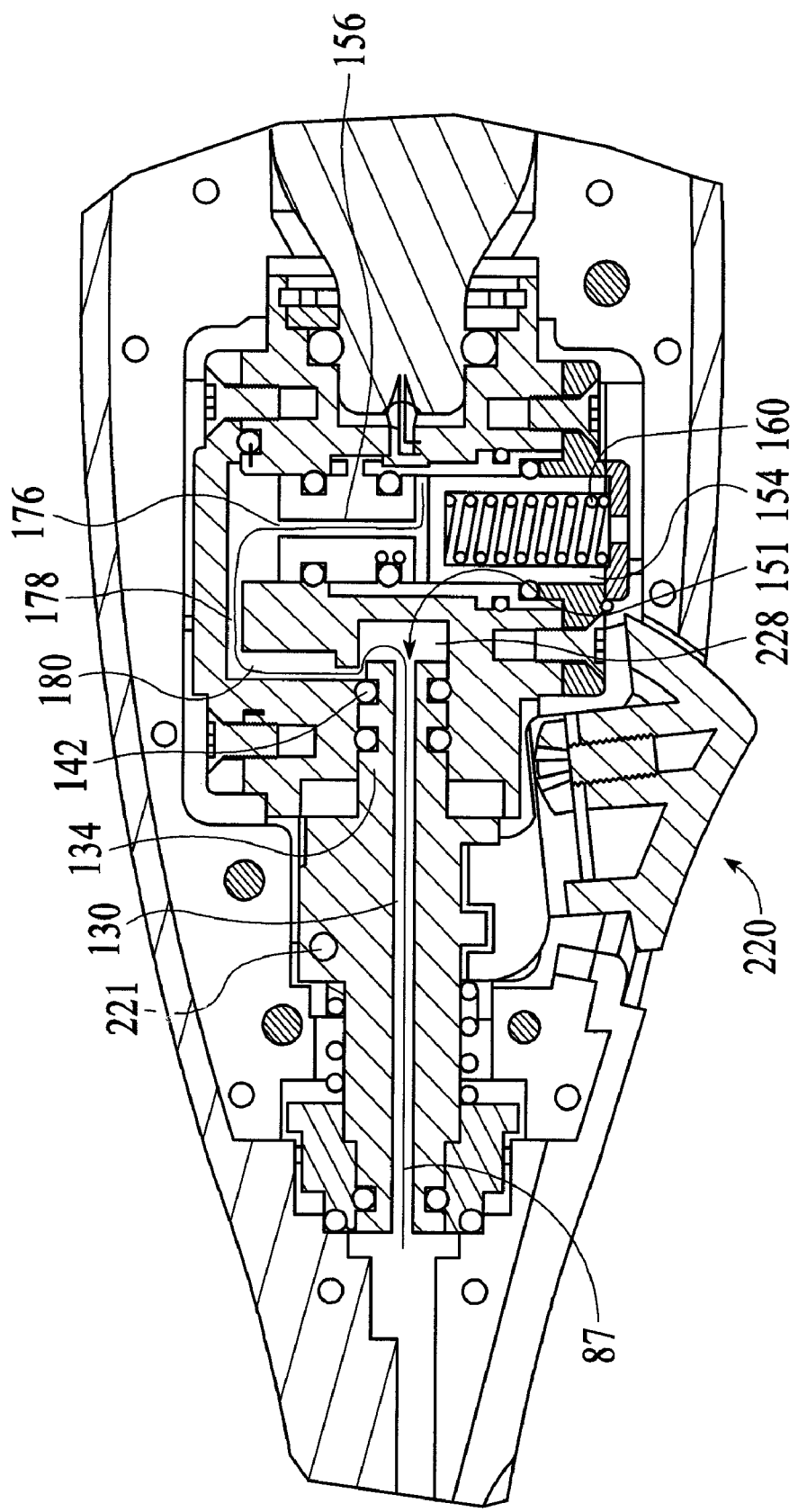
FIG. 15 is a detailed cross-sectional view of a handle assembly, shown in FIG. 9, demonstrating the position of components contained therein with a trigger assembly placed in a third trigger configuration.

Referring to FIGS. 10, 14 and 15, with trigger assembly 220 in a third trigger configuration, trigger assembly 220 moves valve body 128 so that central throughway 130 is in fluid communication with channel 180 via chamber 228. This results from the opening in channel 180 facing valve element 134 being positioned between opening 151 and O-ring 142. This allows fluid, shown by arrows 99 in channels 156, 178 and 180 to propagate through channel 84 and into brewing system 12, shown more clearly in FIG. 3. In the third trigger configuration the fluid in channels 156, 176 and 180 is provided a fluid path 87 to channel 84, shown in FIG. 15.

Referring to FIGS. 11, 14 and 15, MPR 182 operates to prevent over-pressurization of brewing system 12 by allowing venting of fluids in channels 84, 180, 178, 176, central throughway 130 and chamber 228 into void 100, exceeding a maximum desired pressure. For example, were the fluid pressure in path 87 to exceed 200 psi, valve body 196 would compress spring 204 and move away from frusto-conical chamber 208 allowing fluid to move through T-channel 200 and out through venting cap 190 into void 100, shown by arrows 105.

Referring to FIGS. 7, 8, 10 and 15 pressure regulator 152 allows fluid to fill and pressurize channels 156 and 180 to a desired pressure level, e.g., 135 psi, resulting from piercing implement 118 fracturing frangible seal 110 of fluid container 108. Specifically, fluid container 108 contains a compressed fluid, e.g., carbon dioxide $CO_2$, nitrogen $N_2$, oxygen $O_2$ air and the like. Once frangible seal 110 is fractured, pressure regulator 152 is exposed to the compressed fluid, which may be pressurized to 600 psi, contained in fluid container 108. Spring 160 is configured to compress upon the pressure in channels 180, 178, 176 reaching a desired level, e.g., in a range of 135 psi to 165 psi. At which point valve body 154 moves toward trigger element 222 so that O-ring 165 seals aperture 174, effectively isolating fluid container 108 from channels 156 and 180, shown more clearly in FIG. 12. After the pressure decreases in channels 156, 178 and 180, valve element 154 moves away from trigger element 222 once again allowing compressed fluids from fluid container 108 to propagate into channel 156, shown by arrows 101. Pressure regulator 152 maintains a substantially constant pressure of fluid propagating into fluid injection assembly 22 by valve element 154 reciprocating back and forth, in this manner, while trigger assembly 220 places PRS 55 in the third trigger configuration.

Referring to FIG. 3, as mentioned above, fluid container 108 includes compressed fluids, such as $CO_2$, $N_2$, $O_2$, ambient air gases, and the like, at pressure $P_0$. Fluid container 108 is coupled to pressure regulator 152, which controls the flow and pressure of fluid from fluid container 108 to valve element 128. Specifically, pressure regulator 152 operates to maintain the pressure of fluid in channels 156 and 180 in a range of 135 to 165 pounds per square inch (psi), $P_1$. Pressure $P_0$ provides a baseline pressure for use in controlling the flow of liquid in fluid injection assembly 22 over the grounds in receptacle 30, such as in coffee grounds or other brewing substances, such as tea leaves, beans and the like. Thus, providing fluid at such a pressure would enable apparatus 10 to brew a substance such as espresso at the appropriate pressure required for a quality espresso brew. To that end, heated liquid, such as water, is introduced into fluid injection assembly by removing FPC 52, exposing opening 48. FPC system 52 includes grips 250 to facilitate removal of FPC system 52 from pressure vessel 42. After the heated liquid is introduced, FPC system 52 is mounted to pressure vessel 42, forming an interference fit therewith. The liquid is retained in the vessel 42 by FPC system 52 until the brewing process occurs. In an alternate embodiment, fluid injection assembly 22 may include a lid 53 to cover an aperture 57 of vessel 242, shown in FIG. 16. Water, or other fluids, may be introduced into vessel 242 through aperture 57 without having to remove vessel 242 from frame 16, shown in FIG. 2. Aperture 57 would be disposed opposite to throughway 17.

Figure 16:
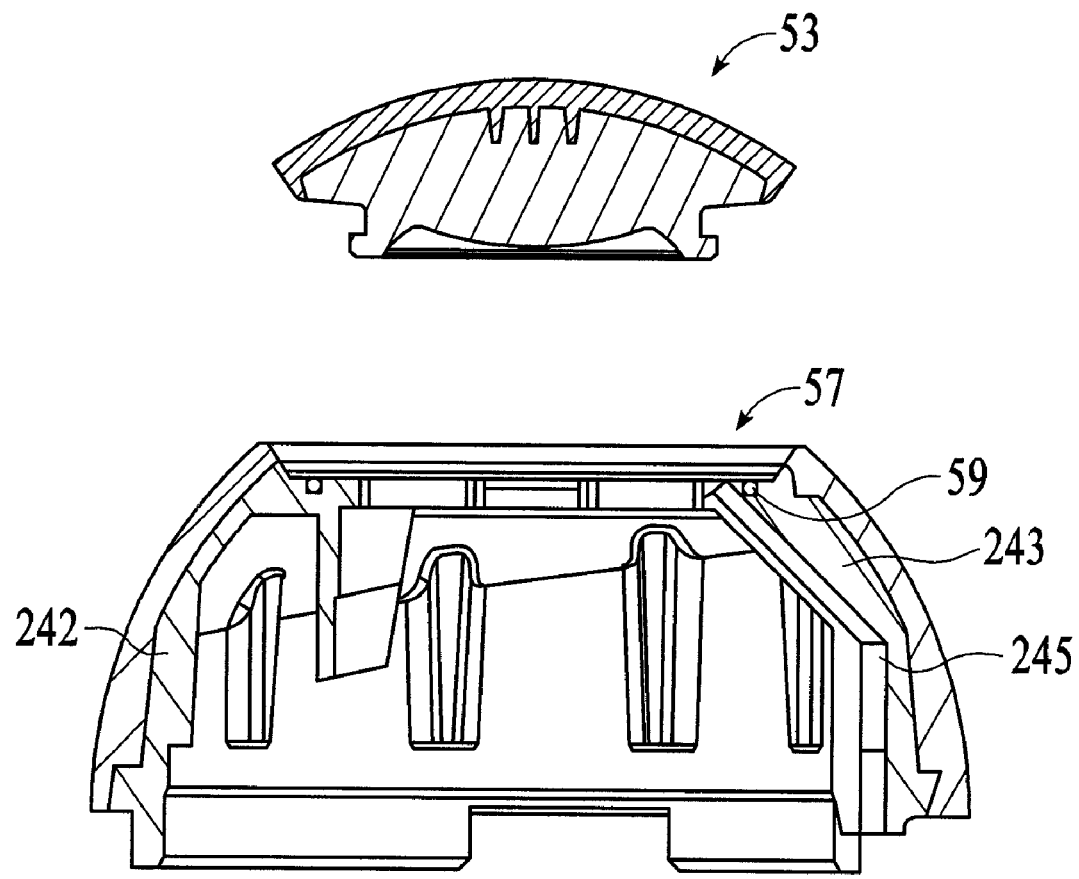
FIG. 16 is a simplified detailed view of a vessel of the fluid injection assembly shown in FIG. 4, in accordance with an alternate embodiment.

Referring again to FIG. 16, lid 53 employs a bayonet mounting system, as discussed above to securely fasten lid 53 to vessel 242. To form a fluid-tight seal between lid 53 and vessel 242, an annular gasket, such as an O-ring 59, may be included so as to be positioned therebetween. Vessel 242 also includes a thickened region 243 in which to machine a conduit 245 that replaces flexible passageway 90, coupling orifice 92 and back flow valve 96, shown in FIG. 3. It should be understood; however, that lid 53, shown in FIG. 16, may be utilized with flexible passageway 90, coupling orifice 92 and back flow valve 96, shown in FIG. 3. The bayonet mounting system and O-ring 59, of FIG. 16, are configured to maintain a fluid-tight seal in excess of the operating pressure of MPR 182, shown in FIG. 7.

Referring to FIGS. 3 and 11, during the brewing process, valve element 134 selectively controls introduction of fluid into fluid injection assembly 22 by activation of trigger assembly 220. In this fashion, a user of apparatus 10 may regulate the quantity of fluid, in this example compressed gas from fluid container 108, into fluid injection assembly 22 to establish a second pressure $P_1$, which may vary at different stages in the brewing process, where its pressure depends on several different factors in the process. To that end, trigger assembly 220 operates to activate different valving operations of valve elements 132 and 134. MPR valve 182 vents fluids into void 100 in response to the pressure of fluid in fluid injection assembly 22 exceeding approximately 200 psi or more, depending upon the design. Specifically, backflow valve 96 facilitates bi-directional fluid flow between chamber 228 and fluid injection assembly 22 to allow MPR valve 182 to operate as a safety feature and while facilitating a flow of fluid from fluid container 108 into fluid injection assembly 22. To that end, back flow valve 96 is fabricated as a pressure sensitive bladder valve that includes two flexible bladder elements 230 and 232 mount to a body 234 that is inserted into tube 90. Bladder elements have an arcuate shape, central portions of which extend substantially equidistant from body 234 compressing together proximate to a central axis 236 of body 234. Central portions are spaced apart from body 234 to facilitate separation of bladder 230 and 232 from central axis 236 forming an opening through which fluid may propagate when the pressure of the fluid is of a predetermined pressure. As designed bladder elements 230 and 232 separate from central axis 236 in the present of a fluid pressure of approximately 200 psi or greater. Back flow valve 96 is formed from santoprene or equivalents.

Referring to both FIGS. 3 and 6, flexible membrane 58 functions to retain fluid, such as water, present in fluid injection assembly 22 until chamber 88 reaches a pressure $P_2$ that exceeds a predetermined magnitude, e.g., above 10 psi. Once pressure $P_2$ is obtained, flexible portion 86 moves away from fluid manifold 56 so that liquid may propagate through showerhead 54 and into collection assembly 20. In this manner, coffee, such as espresso, may be brewed. For brewing espresso, it is desired that pressure $P_2$ be consistently over the minimum pressure value in the chamber 88 for a duration of time sufficient to brew the water over the brewing substance (not shown) in receptacle 30, such as 20-25 seconds for example. The resulting beverage produce, e.g., espresso, may then be exhausted from collection assembly 20 through exhaust port 36 and ultimately into a cup or other container. To assist a user trigger assembly 220 may have perceivable indicator, such as a click mechanism, that would aid the user of apparatus 10 in selecting a desired or optimal brewing result.

Referring to FIGS. 3, 7 and 11 operation of device 10 is described with body 128, MPR 182 and pressure regulator 152 operating synergistically to provide control of fluid pressure and flow in device 10. Fluid, such as $CO_2$, $N_2$, ambient air, or other gas contained at a pressure Po in fluid container 108 communicates or is otherwise in fluid communication with pressure regulator 152. Pressure regulator 152 operates to reduce pressure $P_0$ to $P_1$, which is in a range of 165 psi to 135 psi, inclusive. In this manner, a desired pressure $P_2$ may be generated in brewing system 12 that controls the flow of fluid present in fluid injection assembly 22, e.g., water and/or steam, over the brewing substance in receptacle 30. Thus, providing gas fluid at such a pressure, would enable a device to brew a substance such as espresso at the appropriate pressure required for a quality espresso brew. To that end, operation of PRS 55 is controlled by trigger assembly 220 to regulate the flow of fluid from fluid injection assembly 22 into collection assembly 20. In this manner, the pressure, $P_3$ in collection assembly 20 may be regulated, with the understanding the pressure, $P_2$ may vary during the brewing process. The magnitude of pressure, $P_2$ is dependent upon different factors, including the brewing substance the fluid contained in container 108 and the like. The exact pressure $P_2$ is a function of the resistance of the brewin substatn (not shown) in receptacle 30 to fluid flow and the material from which flexible member 86 is fabricated. It is desired that pressure $P_2$ be established to generate between 1 to 2 ounces of brewed substance exits exhaust port 36 in 20 to 30 seconds.

Figure 17:
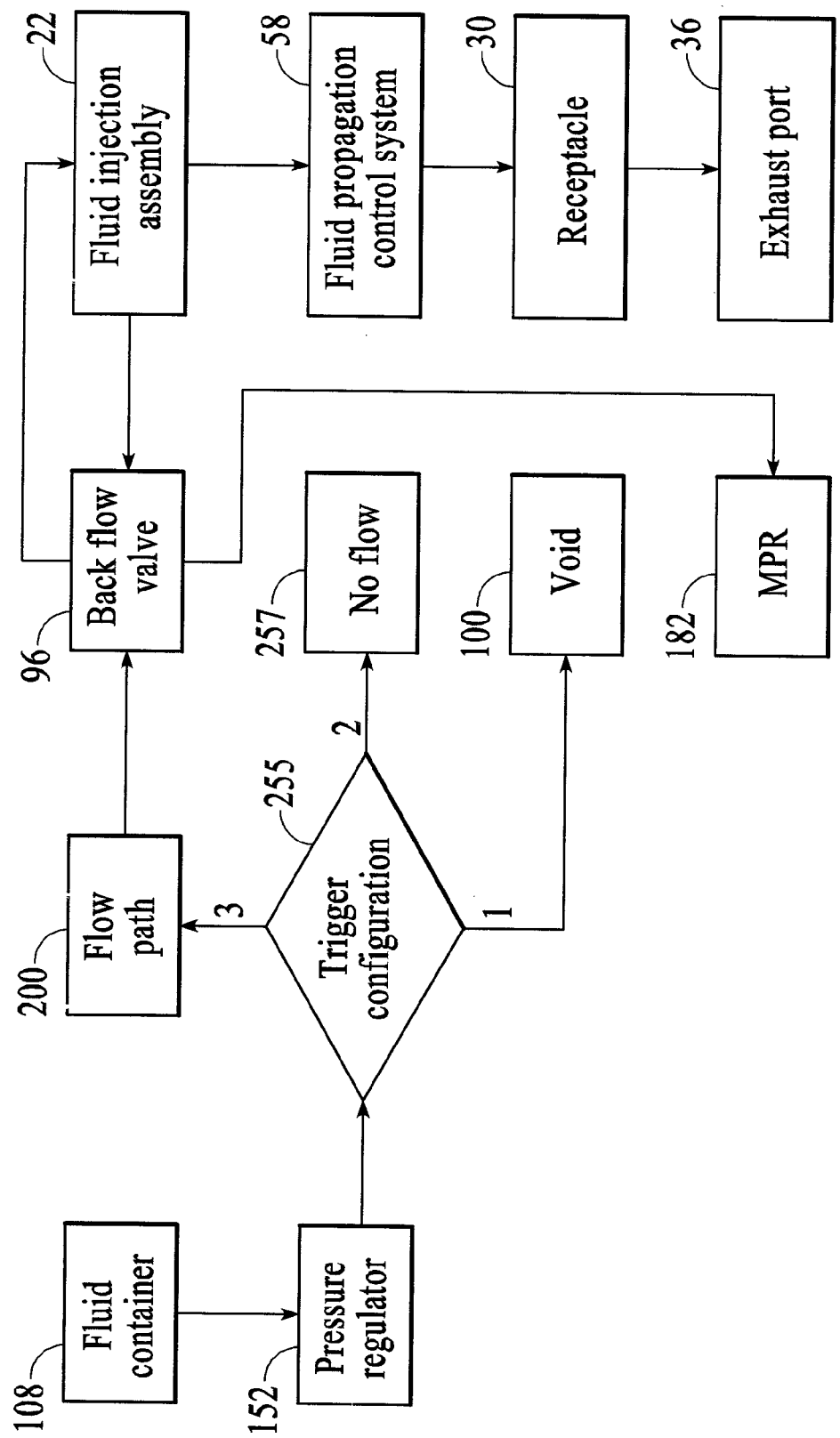
FIG. 17 is a flow diagram showing the fluid communication that occurs between the various parts of the device shown in FIGS. 1 and 3 for different trigger configurations.

Referring to FIGS. 1, 7 and 17, in operation, switching assembly 220 provides PRS 55 with three operating configurations, shown as 1, 2 and 3. In trigger configuration 1, switching assembly 220 provides a venting function 250 by exposing exhaust ports 148 and 150 placing the same in fluid communication with channel 84. In this manner, fluid present in fluid injection assembly 22 propagates through back flow valve 96 through channel 84 over path 87 venting into void 100. In trigger configuration 2, switching assembly 220 configures PRS 55 to terminate path 85, shown in FIG. 8, and effectively prevents the flow of fluids from regulator 152 to channel 84 without generating path 87, shown in FIG. 15. This places device 10 in a "no-flow" configuration, shown in FIGS. 12 and 13. In trigger configuration 3, switching assembly 220 configures PRS 55 to generate path 87 without generating path 85, shown in FIG. 8. In this manner, fluid from fluid container 108 may propagate into fluid injection assembly 22 through back flow valve 96, shown in FIGS. 8, 15 and 17.

Referring to FIGS. 3, 15 and 17, flow communication within device is shown with fluid container 108 in fluid communication with pressure regulator 152. Pressure regulator 152 is selectively placed in fluid communication with flow path 87, void 100 or neither, dependent upon the trigger configuration 255 provided by switching assembly 220. In trigger configuration 1 pressure regulator 152 is placed in fluid communication with void 100. In trigger configuration 2, pressure regulator 152 is not in fluid communication with either flow path 87 or void 100, as device 10 is placed in a no flow condition 257. In trigger configuration 3, pressure regulator 152 is placed in fluid communication with fluid injection assembly 22 through flow path 87 and back flow valve 96. As a result, fluid from container 108 moves into fluid injection assembly 22 driving liquid or other fluid present in fluid injection assembly 22 through fluid propagation control system 58, into receptacle 30 and through exhaust port 36.

Figure 18:
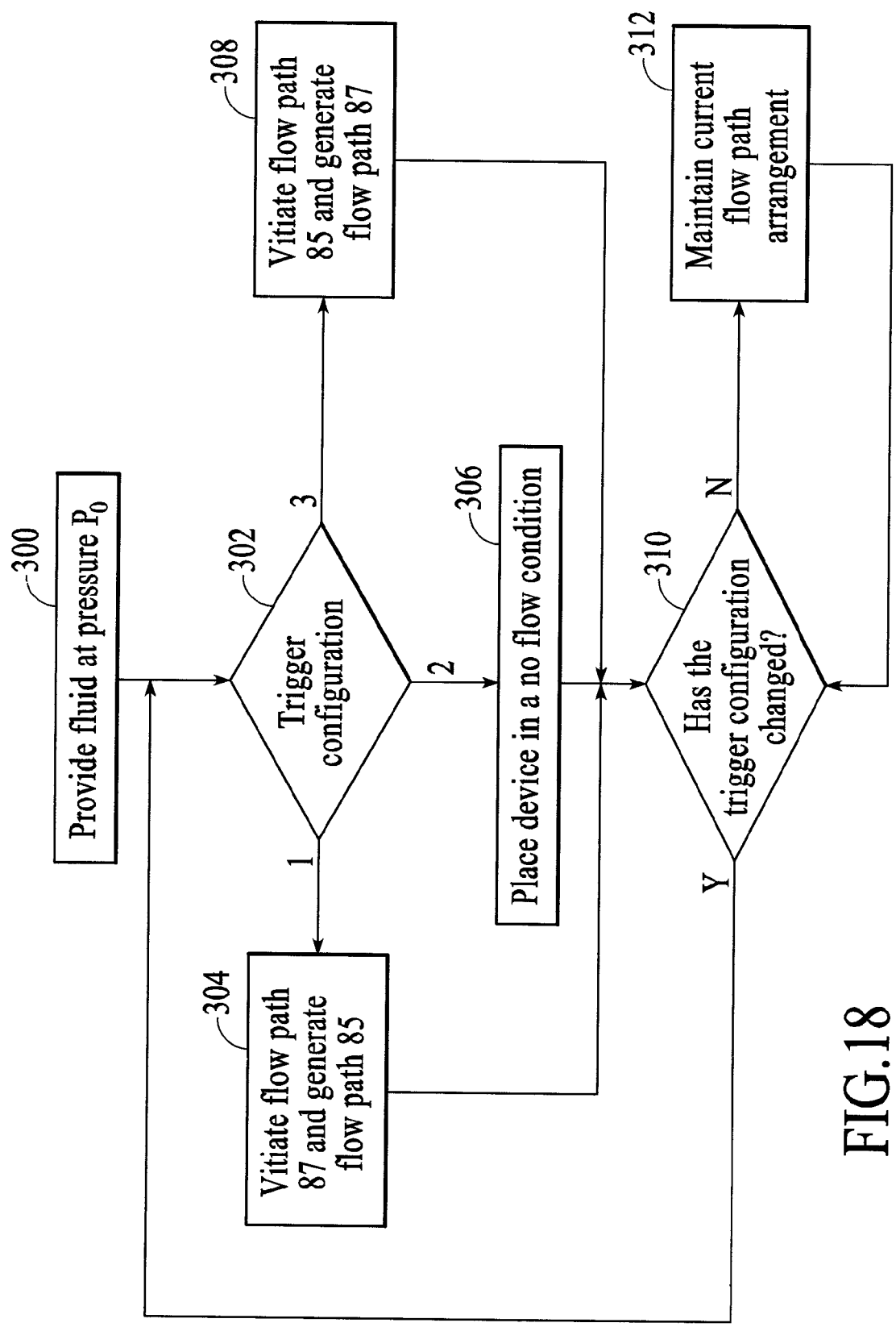
FIG. 18 is a simplified flow diagram demonstrating the different flow paths of the device shown in FIGS. 1 and 3 for different trigger configurations.
Figure 19:
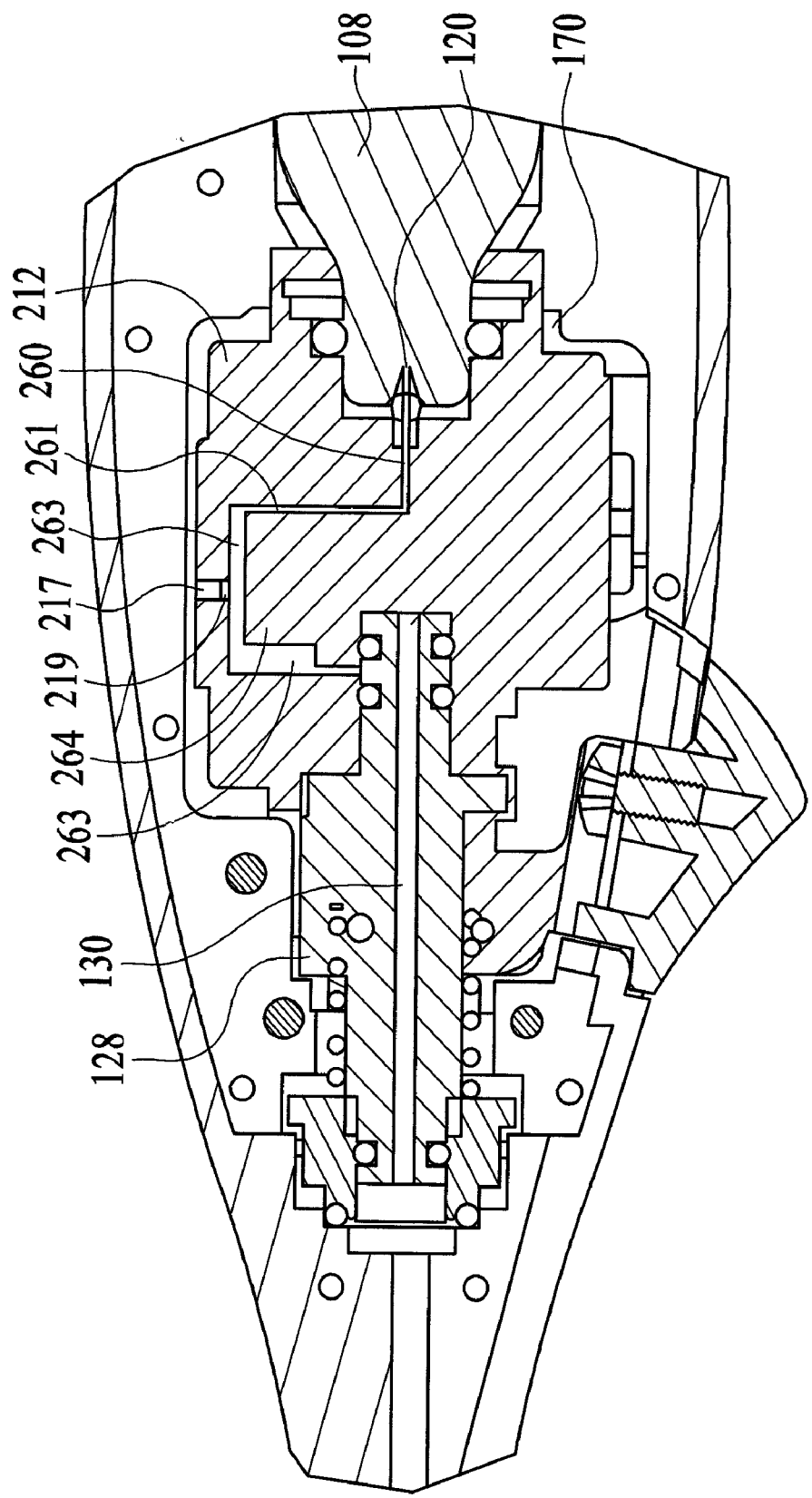
FIG. 19 is a detailed cross-sectional view of a handle assembly, shown in FIG. 9 in accordance with an alternate embodiment of the present invention.
Figure 20:
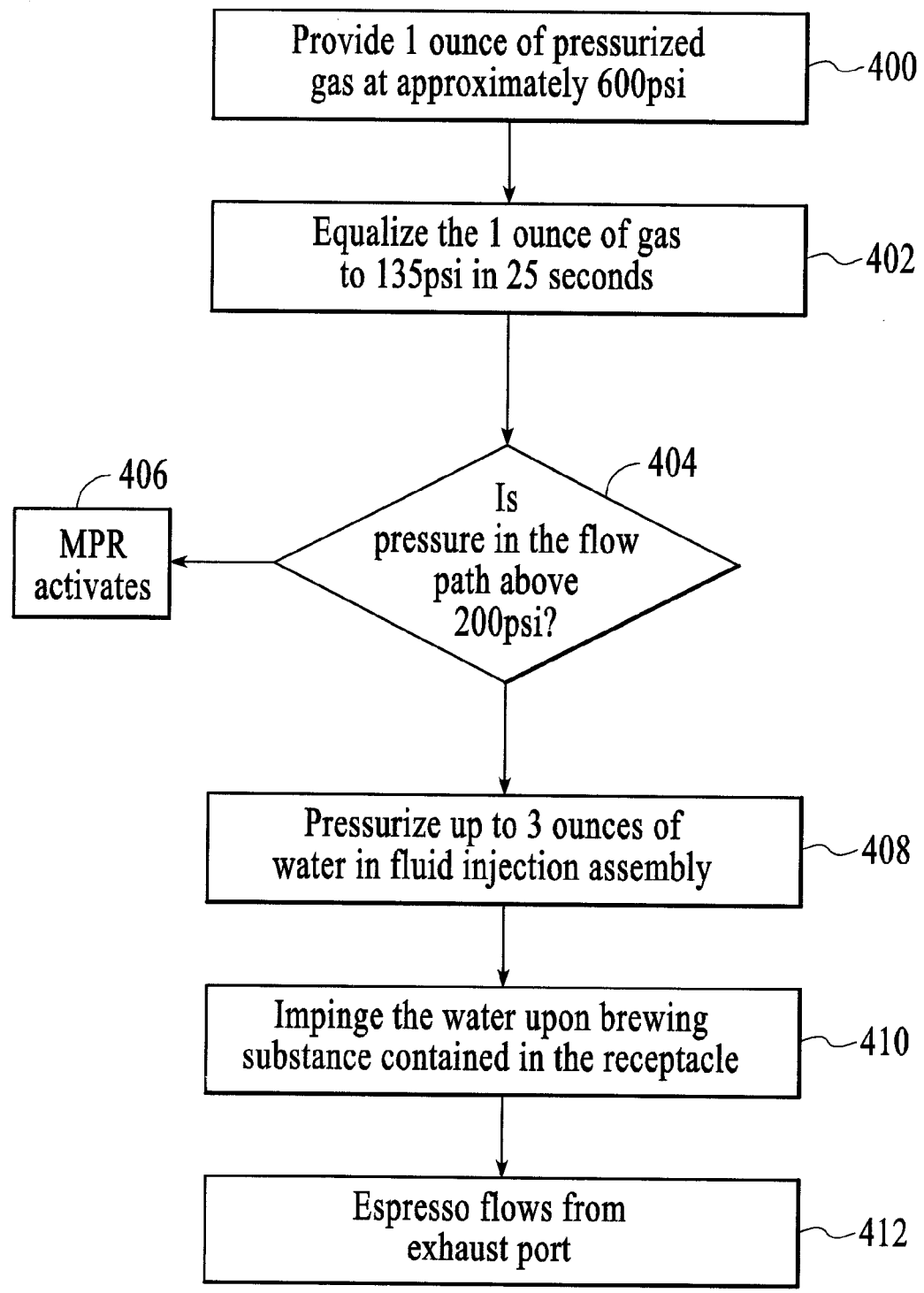
FIG. 20 is a flow diagram showing the operation of the brewing device, shown in FIG. 19.

Referring to both FIGS. 3 and 18, propagation of fluid from fluid container 108 through brewing device 10 is shown. At function 300, fluid from fluid container 108 is made available to device at a pressure $P_0$. At function 302 configuration of PRS 55 is determined by switching assembly 220 being in one of three trigger configurations. In trigger configuration 1, vitiates flow path 87 and establishes flow path 85 at function 304. In trigger configuration 2, device 10 is placed in a no flow condition at function 306. In trigger configuration 3, flow path 85 is vitiated and flow path 87 is generated, thereby allowing fluid from fluid container 108 to propagate into fluid injection assembly 22 at function 308, while preventing venting into void 100 through exhaust ports 148 and 150. Either trigger configuration 1, 2 or 3 is maintained until the trigger position of switching assembly 220 has been determined to have undergone a change in configuration, at function 310. If no change in trigger configuration has occurred the method proceeds to function 312 wherein the flow path arrangement of device 10 is maintained. Were the trigger configuration of switching assembly 220 determined to have changed, the method proceeds to function 302. It is desired that switching assembly 220 is biased so as to be in trigger configuration 1.

Movement of PRS 55 between trigger configurations 1 and 3 is not a binary operation. Rather, switching assembly 220 causes PRS 55 to move over a range of motion between trigger configurations 1 and 3 and generates or vitiates one or more flow paths 85 and 87. As a result, in trigger configuration 1, switching assembly 220 establishes PRS 55 in a first range of motion during which channel 84 is in fluid communication with void 100, as discussed above. In trigger position 2, switching assembly 220 establishes PRS 55 to be in a second range of motion during which device 10 is placed in the no flow condition. In trigger position 3, PRS 55 is in a third range of motion, during which pressure, $P_2$, is established in fluid injection assembly 22 until it exceeds a predetermined threshold at which point, flexible membrane 58 moves to allow fluid communication with collection assembly 20. The predetermined threshold is typically above 10 psi. Once that pressure is obtained, fluid present in fluid injection assembly 22 may propagate into collection assembly 20 and flow over the brew substance, such coffee grounds to brew espresso. As a result, flexible membrane 58 is configured to maintain a fluid-tight seal between fluid injection assembly 22 and collection assembly 20 in the absence of fluid injection assembly being pressurized above the threshold pressure. Thus, for fluid, such as hot water, disposed in fluid injection assembly 22 to pass over brewing substance in receptacle 30, it is desired that pressure $P_2$ be at or above the minimum retention valve pressure so that the flexible membrane 58 releases the water over the grounds. For brewing espresso, it is desired that pressure $P_2$ be maintained above the minimum threshold pressure as the fluid moves over brewing substance, e.g., 20-25 seconds.

Referring to FIGS. 3, 7, 9 and 19 in accordance with another embodiment of the present invention, PRS 55 may omit pressure regulator 152 and be used in conjunction with all other components of brewing device 10. Instead of pressure regulator 152, a flow constriction device is employed to reduce pressure $P_0$ in fluid propagation through channel 120. Flow constriction device includes flow channels 260, 261 and 263 and a variable volume channel (VVC) 264 formed into bulwark 212. Flow channel 260 extends from channel 120 along a first direction and terminates proximate to flow channel 261 that is in constant fluid communication therewith. Flow channel 261 extends along a second direction, transverse to the first direction and terminates in VVC 264. VVC 264 extends along first direction, parallel to flow channel 260. Flow channel 263 extends along the second direction parallel to flow channel 261, terminating in an opening facing valve body 128. A bore 217 is formed into a side of bulwark 212 and terminates in an opening in VVC 264. The volume of VVC 264 may be varied by means of a flow restrictor valve 219. In the present example flow restrictor valve 219 is a threaded member that may move into and out of VVC 264. In this manner, the pressure drop between channel 120 and central throughway 130 may be controlled to provide the desired pressure of fluid propagating through central throughway 130 toward fluid injection assembly 22, e.g., 135 psi to 165 psi.

Referring to FIGS. 3, 8, 19 and 20, in operation 1 ounce of pressurized gas is provided at approximately 600 psi by fluid container 108, at function 400. At function 402 the flow constriction device equalizes the gas to a desired pressure level in a desired range of time, e.g., approximately 135 psi in approximately 25 seconds. If the pressure is above the desired safety limit, in this example 200 psi, at function 404, then venting to void 100 is achieved employing maximum pressure release valve MPR valve 182, at function 406. Otherwise, function 408 occurs in which fluid propagating into fluid injection assembly 22 pressurizes up to 3 ounces of water. Then water exiting fluid injection assembly 22 impinges upon the brewing substance in receptacle 30, at function 410. Following function 410, espresso flows from exhaust port 36, at function 412.

Figure 21:
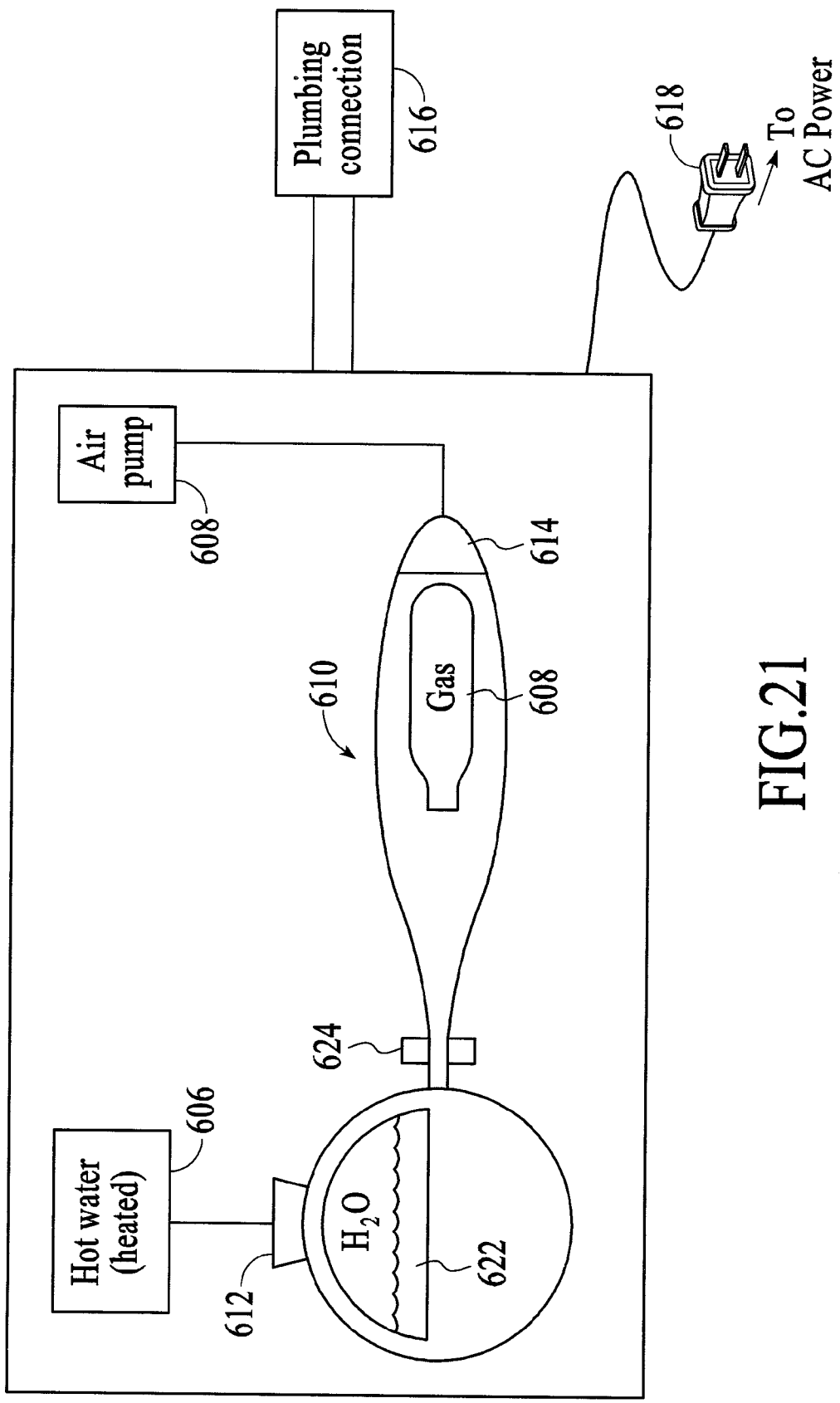
FIG. 21 is a simplified plan view of a docking station that may be employed to recharge a brewing device, shown in FIGS. 1, 3, 16 and 19, in accordance with a second alternate embodiment of the present invention.

Referring to FIG. 21, a base station 602 is shown in which to prepare device 610 for brewing of a brewing substance. To that end, base station 602 may include a hot water heater 606 to increase the temperature of water or other fluid, such as a liquid or gas, present in fluid injection assembly 622. In one embodiment, hot water heater may deliver water to fluid injection assembly 622. Coupling thereto may be by way of a snap connector 612. As a result, a plumbing connection 616 and AC (or DC) power connection 618 may be included.

Alternatively, hot water heater may simply heat water present in fluid injection assembly 622 to a desired temperature, via conduction and/or convection. Base station 602 may include a pump for pressurizing container 608 with the desire fluid. Coupling thereto may be by way of a snap connector 614. The device may be configured to be held in place by a snap coupling 624 in and be recharged with compressed gas and refilled with hot water. Other designs may have one feature or the other, or both.

Figure 22:
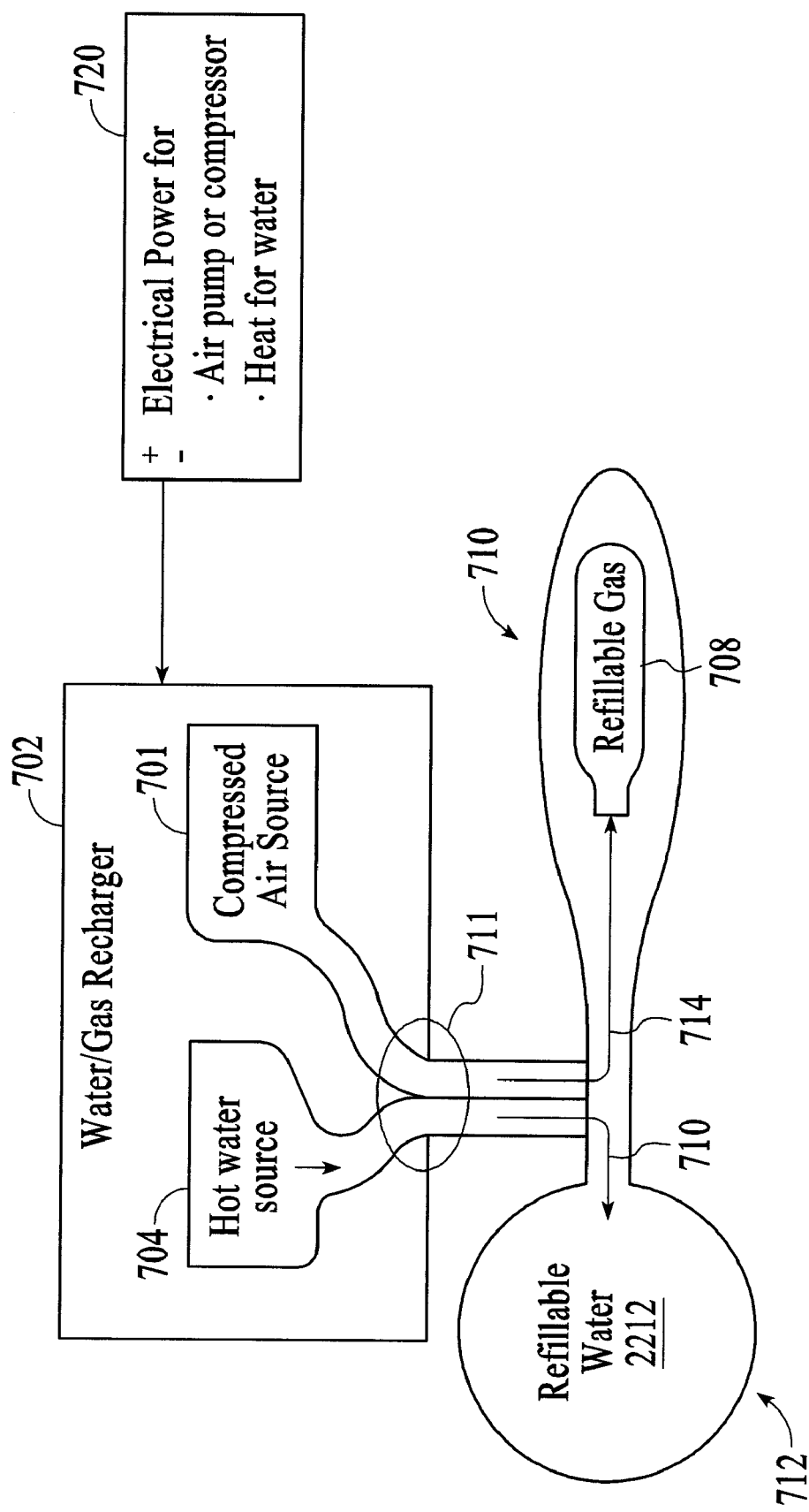
FIG. 22 is a simplified plan view of a portable recharging station that may be employed to recharge a brewing device, shown in FIGS. 1, 3, 16 and 19, in accordance with a second alternate embodiment of the present invention.

Referring to FIG. 22, a portable recharging station 702 for a brewing device 710 may include a source of hot water 704 and compressed air source 701. Additionally, an optional electrical power source 720 for an air pump or compressor or a heater for water may be included. A coupling device 711 may provides coupling with both brewing system 712, over line 2210 and fluid cartridge 708 over line 714.

From the description of water-pump based espresso machines above it can be seen that the pump is also a form of control flow device. In a compressed gas espresso system the function of the pump can be replaced by a pressure-sensitive flow restrictor. This negates the need for a gas pressure regulator, and solves the safety issue relating to rapid decompression. The compressed gas system thereafter replicates the behavior of a water-pump based espresso machine with the advantages of a portable, powerless and silent main motive force.

It should be understood that the description set forth above are examples of the different embodiments of the present invention. Many modifications and changes may be recognized by those of ordinary skill in the art. Therefore, the scope of the invention should not be limited to the description set forth above. Rather, the scope should be determined by the claims including the full scope of equivalents.

The invention claimed is:

1. A brewing device, comprising:
a brewing system;
a handle assembly coupled to the brewing system, comprising:
  a handle assembly body;
  a source of compressed fluid within the handle assembly body, wherein the source provides the fluid at an initial pressure of $P_0$; and
  a valve system within the handle assembly body and coupled between the brewing system and source of compressed fluid, to selectively place the source of compressed fluid in fluid communication with the brewing system, which regulates the fluid pressure to provide the fluid to the brewing system at a pressure $P_1$ which is less than $P_0$, where $P_1$ is independent of $P_0$.

2. A portable brewing device, comprising:
a compressed gas container;
a pressure regulator configured to control the release of gas from the compressed gas container;
a regulated gas vessel configured to hold a gas at a predetermined pressure when released from the pressure regulator;
a flow valve communicating with the pressure regulator that controls the flow of compressed gas into the water vessel;
a water vessel communicating with the flow valve;
a water release valve configured to release water when the water vessel is above a predetermined level;
a grounds vessel communicating with the water vessel and configured to receive water from the water vessel to brew espresso;
an outlet configured to release espresso produced from water flowing through grounds contained in the grounds vessel when brewing;
a safety valve configured to release pressure from the water vessel; and
a gas release mechanism in fluid connection with the pressure regulator, wherein the gas release mechanism is configured to release compressed gas under the control of the pressure regulator.

3. A portable brewing device, comprising:
a compressed gas container;
a pressure regulator configured to control the release of gas from the compressed gas container;
a regulated gas vessel configured to hold a gas at a predetermined pressure when released from the pressure regulator;
a flow valve communicating with the pressure regulator that controls the flow of compressed gas into the water vessel;
a water vessel communicating with the flow valve;
a water release valve configured to release water when the water vessel is above a predetermined level;
a grounds vessel communicating with the water vessel and configured to receive water from the water vessel to brew espresso;

an outlet configured to release espresso produced from water flowing through grounds contained in the grounds vessel when brewing;

a safety valve configured to release pressure from the water vessel; and a gas release mechanism in fluid connection with the pressure regulator, wherein the gas release mechanism is configured to access the compressed gas container, allowing the flow valve to release compressed gas governed by the pressure regulator.

4. A portable brewing device, comprising:

a compressed gas container;

a pressure regulator configured to control the release of gas from the compressed gas container;

a regulated gas vessel configured to hold a gas at a predetermined pressure when released from the pressure regulator;

a flow valve communicating with the pressure regulator that controls the flow of compressed gas into the water vessel;

a water vessel communicating with the flow valve;

a water release valve configured to release water when the water vessel is above a predetermined level;

a grounds vessel communicating with the water vessel and configured to receive water from the water vessel to brew espresso; an outlet configured to release espresso produced from water flowing through grounds contained in the grounds vessel when brewing;

a safety valve configured to release pressure from the water vessel; and a gas release mechanism in fluid connection with the pressure regulator, wherein the compressed gas container is a pre-compressed and sealed container, and wherein the gas release mechanism is a piercing member configured puncture the container to release compressed gas.

* * * * *